US011425157B2

(12) United States Patent
Tan et al.

(10) Patent No.: US 11,425,157 B2
(45) Date of Patent: Aug. 23, 2022

(54) MODEL BASED METHODOLOGY FOR TRANSLATING HIGH-LEVEL CYBER THREAT DESCRIPTIONS INTO SYSTEM-SPECIFIC ACTIONABLE DEFENSE TACTICS

(71) Applicant: California Institute of Technology, Pasadena, CA (US)

(72) Inventors: Kymie Tan, Pasadena, CA (US); Jeremy L. Pecharich, Claremont, CA (US); Arun A. Viswanathan, La Mirada, CA (US); Marc I. Pomerantz, Glendale, CA (US); Deniz E. Celik, Sunnyvale, CA (US); Bryan Johnson, Temple City, CA (US); Brian Wright, Goode, VA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 587 days.

(21) Appl. No.: 16/215,225

(22) Filed: Dec. 10, 2018

(65) Prior Publication Data
US 2020/0067962 A1   Feb. 27, 2020

Related U.S. Application Data

(60) Provisional application No. 62/722,417, filed on Aug. 24, 2018.

(51) Int. Cl.
*H04L 9/40* (2022.01)
*G06N 5/02* (2006.01)
*G06F 16/2455* (2019.01)

(52) U.S. Cl.
CPC ...... *H04L 63/1433* (2013.01); *G06F 16/2455* (2019.01); *G06N 5/02* (2013.01); *H04L 63/20* (2013.01)

(58) Field of Classification Search
CPC . H04L 63/1433; H04L 63/20; G06F 16/2455; G06N 5/02
(Continued)

(56) References Cited

U.S. PATENT DOCUMENTS 7,627,543 B2 * 12/2009 Lock ................. G06N 5/025
706/47
8,407,798 B1 * 3/2013 Lotem ................ G06F 21/577
726/21
(Continued)

OTHER PUBLICATIONS

NPL Search Terms (Year: 2021).*
(Continued)

*Primary Examiner* — Syed A Zaidi
(74) *Attorney, Agent, or Firm* — Gates & Cooper LLP

(57) ABSTRACT

A method, apparatus, and system provide the ability to act on cyber risks and reduce cyber attacks. System characteristics and system information for a cyber system are gathered. The system characteristics and system information are pre-processed to identify vulnerabilities that are relevant to the cyber system. A system model of a cyber environment is generated for the cyber system. One or more features are converted from cyber threat reports to one or more semantically relevant queries over the system model. The system model is reasoned over to generate one or more answers relevant to the one or more semantically relevant queries. Attack models are executed over the system model to generate actionable intelligence and reduce cyber attacks.

22 Claims, 12 Drawing Sheets

(58) Field of Classification Search
USPC .......................................................... 726/25
See application file for complete search history.

(56) References Cited

U.S. PATENT DOCUMENTS

| | | | | |
|---|---|---|---|---|
| 2003/0212909 | A1* | 11/2003 | Chandrashekhar ... | G06F 21/577 726/25 |
| 2007/0192867 | A1* | 8/2007 | Miliefsky ............. | G06F 21/577 726/25 |
| 2008/0005784 | A1* | 1/2008 | Miliefsky ........... | H04L 63/1433 726/3 |
| 2015/0074055 | A1* | 3/2015 | Jacoby ................ | G06F 11/0778 707/639 |
| 2019/0222604 | A1* | 7/2019 | Vaidya ................ | H04L 63/1416 |
| 2019/0354809 | A1* | 11/2019 | Ralhan .................. | G06F 16/116 |

OTHER PUBLICATIONS

Wang, Ju An, and Minzhe Guo. "Security data mining in an ontology for vulnerability management." 2009 International Joint Conference on Bioinformatics, Systems Biology and Intelligent Computing. IEEE, 2009. (Year: 2009).*

Sun, Yan, et al. "Multilayered impact evaluation model for attacking missions." IEEE Systems Journal 10.4 (2014): 1304-1315. (Year: 2014).*

Musman, Scott, et al. "Computing the impact of cyber attacks on complex missions." 2011 IEEE International Systems Conference. IEEE, 2011. (Year: 2011).*

NPL Search Terms (Year: 2022).*

Kerzhner, A., et al., "Analyzing Cyber Security Threats on Cyber-Physical Systems using Model-Based Systems Engineering", American Institute of Aeronautics and Astronautics, 2015, pp. 1-11.

Johnson, B., et al., "Analyzing Cyber Security Threats on Cyber-Physical Systems using Model-Based Systems Engineering", Jet Propulsion Laboratory California Institute of Technology, 2015, pp. 1-19.

Pecharich, J., et al., "Mission-Centric Cyber Security Assessment of Critical Systems", American Institute of Aeronautics and Astronautics, 2016, pp. 1-23.

Pecharich, J., et al., "Mission-Centric Cyber Security", Jet Propulsion Laboratory California Institute of Technology, 2016, pp. 1-35.

* cited by examiner

MODEL BASED METHODOLOGY FOR TRANSLATING HIGH-LEVEL CYBER THREAT DESCRIPTIONS INTO SYSTEM-SPECIFIC ACTIONABLE DEFENSE TACTICS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/722,417, filed on Aug. 24, 2018, with inventor(s) Kymie Tan, Jeremy L. Pecharich, Arun A. Viswanathan, Deniz E. Celik, Bryan Johnson, and Brian Wright, entitled "Translating High-Level Cyber Threat Descriptions Into System-Specific Actionable Defenses."

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION

1. Field of the Invention

The present invention relates generally to cyber security, and in particular, to a method, apparatus, system, and article of manufacture for translating a cyber threat into actionable intelligence and the utilization of such intelligence to eliminate/reduce the risk.

2. Description of the Related Art

Cyber systems (computing elements, networks and components) control almost every aspect of our society today. An area of particular concern is the cyber systems that support our critical infrastructure, the financial, communication, power and nuclear systems. Concomitant with the ubiquity of cyber systems is the rapid and exponential growth of malicious threats against these systems. As an example, consider that in 2017, on average, 200 new vulnerabilities per week are identified and added to the National Vulnerability Database. Also in 2017, KASPERSKY LABS reported that, on average, around 323,000 new malware were identified per day compared to 70,000 per day in 2011.

To support the defense of cyber systems in general, cyber threat information is disseminated by entities such as US-CERT (United States Computer Emergency Readiness Team), DHS (Department of Homeland Security), NIST (National Institute of Standards and Technology) and MITRE (The MITRE Corporation) on a daily basis in the form of threat or vulnerability reports. The aim of these reports is to inform the defense community about the general characteristics of a threat. These reports contain information such as the nature of a vulnerability, its severity, its general impact on a system, and techniques, tactics and procedures used by a potential adversary in exploiting the vulnerability. A fundamental and significant challenge facing organizations consuming such threat reports lies in the translation from the high-level, general vulnerability information contained in those reports into actionable intelligence and tactics specific to their own cyber systems. The ability to carry out this translation is not only critical to the defense of cyber systems, but so too is the ability to do it quickly and accurately. Speed is necessary to ensure that the defense response is timely enough to contain and/or neutralize active adversarial tactics (note that an attack action can occur as fast as a CPU (central processing unit) can execute a "bad" instruction, i.e., in microseconds), and accuracy is necessary to minimize collateral damage to surrounding systems.

Consider, for example, a recent threat bulletin from the National Cybersecurity & Communications Integration Center (NCCIC). The advisory simply states that the, "NCCIC is aware of a Linux kernel vulnerability affecting Linux versions 4.9 and greater. An attacker could exploit this vulnerability to cause a denial-of-service condition" (CVE-2018-5740). Such a bulletin does not and cannot provide critical information needed by an organization wishing to consume this information to produce an effective list of defensive actions, for example, information such as:

1. The population of Linux kernel version 4.9 within an organization's domain,
2. Of those, the number that support critical mission objectives directly or indirectly,
3. Of those, the number that are affected by a denial-of-service condition,
4. Of those the number that are connected to other critical areas of the facility and also to external partners, and finally,
5. Of those, a list of the operational contexts that determine the constraints on remediation actions, that is, information needed to prioritize the assets for various remediation actions such as the removal of the asset or a forced degradation of services as the OS is being updated.

In the majority of institutions today, determining the answer to the first question itself is not easily or quickly obtainable, and can take weeks. However, it is in the second and subsequent items where the problems lie. Cyber systems comprising enterprises typically consist of thousands of hosts, running thousands of applications, supporting hundreds of high-level business functions and interconnected and interdependent in ways combinatorically infeasible to enumerate. Thus, to identify the business context of a single type of weakness in a specific type and version of an operating system becomes a non-trivial and highly complex task. Cyber analysts need to possess detailed and accurate domain knowledge of such complex environments, and then be able to reason over the threats with this domain knowledge to derive meaningful actionable intelligence. Moreover, the rapidly evolving threat landscape makes it difficult to effect traditional (but necessary) human-based risk assessments on the core infrastructure of any enterprise for one main reason: the cyber environment by its nature is not visible, therefore the increasing complexity and rapidity of evolution typical of such environments makes it almost impossible to exploit effective human problem-solving and assessment capabilities such as pattern matching and evidence identification.

The derivation of actionable intelligence and defense tactics from high-level threat information is currently performed manually where reliance on human memory and SME (Subject Matter Expert) knowledge is significant. In addition, it is practically impossible for a human to process, manually, the number of cyber systems and applications that are interconnected in a plethora of ways while also taking into account a rapidly evolving threat landscape. Accordingly, what is needed is an automated tool that translates high-level threat reports into concrete actionable intelligence and tactics relevant to a specific system and stakeholder across thousands of hosts in a cyber system in a timely and efficient manner.

SUMMARY OF THE INVENTION

Embodiments of the invention provide a novel model-based methodology for translating high-level threat reports into concrete actionable intelligence and tactics relevant to a specific system and the stakeholder.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
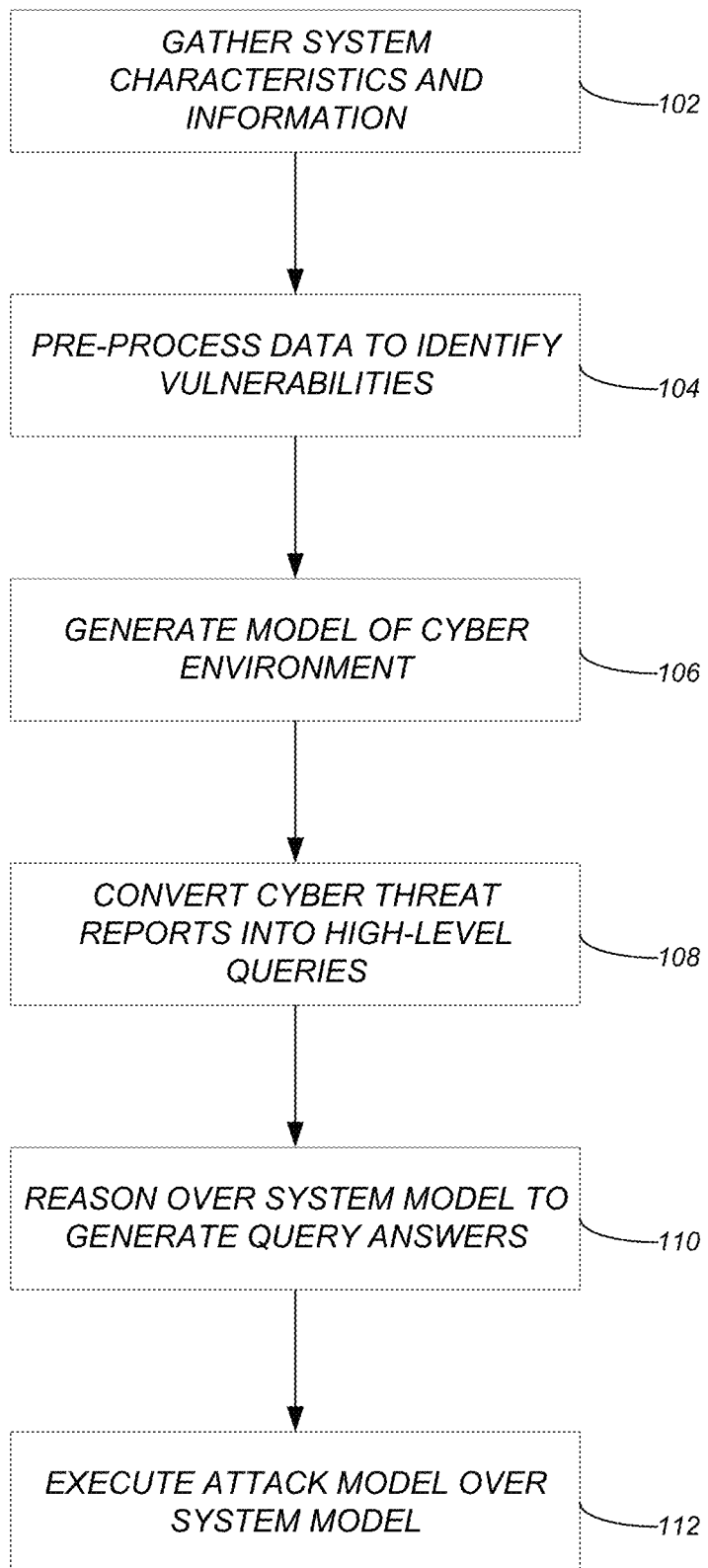
FIG. 1 illustrates a logical flow for translating high-level threat reports into concrete actionable intelligence and tactics relevant to a specific system and the stakeholder in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview and Logical Flow

Embodiments of the invention provide a novel model-based methodology for translating high-level threat reports into concrete actionable intelligence and tactics relevant to a specific system and the stakeholder. The methodology can be summarized into the high-level steps illustrated in FIG. 1, with each step being detailed in subsequent sections. As used herein, embodiments of the invention refer to the system as CAVE (Cyber Analysis and Visualization Environment), an executable tool that implements the methodology set forth herein.

At step 102, system characteristics and information are gathered (automated process). These characteristics and information include details regarding computer systems, networks, applications, and data flows in the environment. (see the section entitled Host-based Asset Profiling below). Some of the more important data it gathers are the business/mission objectives and workflows that characterize the facility.

At step 104, CAVE pre-processes the data collected to identify vulnerabilities that are relevant to the system under consideration (see the section Low-error Vulnerability Identification below).

At step 106, CAVE automatically generates a model of the cyber environment capturing all the necessary attributes and dependencies (see the section Model Generation below).

At step 108, salient features from high-level cyber threat reports are converted to semantically-relevant queries over the model (see the section Semantically-relevant Query Formulation below).

At step 110, CAVE automatically reasons over the model to generate answers relevant to the query. This forms only a part of the actionable intelligence (see the reasoning over multiple models of system information below).

As part of step 110, CAVE may automatically factor in attributes such as the age of the data and the source of the data to compute a confidence score for each piece of data presented in the model. Answers generated by the model are then ranked based on their confidence to eliminate error-prone answers and improve the analytical accuracy of queries that are relevant to the system (see the section Uncertainty Calculus below).

At step 112, CAVE executes high-level attack models over the system model to generate comprehensive actionable intelligence for the analyst (see the section Threat Modeling and Simulation below).

The output generated by this methodology improves on the accuracy of threat analysis, because analyses are based on direct system information and not SME (Subject Matter Expert) memory, and are semantically relevant to the analyst.

Further to the above, step 112 may include the actual execution of the actionable intelligence that acts on cyber risks and thereby serves to reduce the likelihood of successful cyber attacks.

Use Cases

This section describes the variety of ways that CAVE may be implemented/used and also identifies the main recipient of the CAVE instance.

Design Tool

Problem:

As computer systems and networks become more complex, understanding the impact of a design decision within that environment becomes extremely difficult. Consider a decision to install network monitoring on a server in order to detect adversary indicators in the data. However, if that server were logically positioned behind a firewall, where the firewall rules may have inadvertently removed key features in the data and thus compromising the ability of the monitoring system, then the decision to place the monitor on that particular server is an ineffective and potentially costly one. In this case, the environmental context of the server and its position relative to the various firewalls is critical in designing an effective defensible environment.

In mission or safety critical environments, uninformed design decisions can not only cost millions to correct, but can result in severe damages when the adversary, or even human error, exploits the poorly informed security design.

CAVE Contribution:

CAVE provides a detailed model of the cyber infrastructure that goes beyond the simple identification of hardware and into a multidimensional description of the cyber environment that includes account permissions, file system mount points, virtual machines, software and their processes, work flows etc. Furthermore, this system architecture is analyzable, allowing a designer complete visibility through a flexible query engine. In the case of the monitoring example above, CAVE provides the designer with a rule-based interface that can be used to identify what type of information is allowed to flow through the various elements of the system architecture such as network firewalls and network layer 2/3 switches. The designer can effectively "see" the most effective positions within the infrastructure to deploy monitoring systems such that the monitors are afforded access to unmodified data and thus optimize their ability to capture indicators of adversarial activity.

Project Protection Plan Tool (E.g., Department of Defense [DoD])

Problem:

The Project Protection Plan (PPP) is a document that describes how well a project defends itself against a given set of threats. The PPP is a required element of mission design (e.g., in the military) which drives requirements for the mission so that the proper protection is in place. One element of the PPP is the Threat Summary which attempts to document the threat environment that a system or aircraft is most likely to encounter as it reaches operational capability. The problem lies in the interplay between classified and unclassified information that must necessarily be combined to understand the impact of the threats. An analyst must pull from various sources, classified and unclassified, to construct the PPP. This back-and-forth process is risky from an information spillage standpoint and prone to human error due to the differing context of the two domains.

CAVE Contribution:

With CAVE, the entire model of the unclassified infrastructure can be captured and brought into the classified environment for the analyst. From the threat summary, classified attack trees can be coded so that CAVE can operate on both the unclassified and classified threats. Unclassified mission designers have access to the unclassified form of the model to which they can design, and the design can be brought into the classified realm where classified threats can be overlaid on the existing model for validation purposes.

Risk Assessment Tool (Europa Project, NASA)

Problem:

Jet Propulsion Laboratory (JPL) missions use the same methodology employed by all federal and commercial entities to identify an institution's risks to cyberattacks. The current risk-assessment process relies on surveys across the individual process owners, and incorporates the disparate pieces of information to assess the current risk posture of the mission. The process is labor-intensive and prone to sources of error because the individual process owners do not typically know or possess system-level knowledge about their component—for example, an instrument system engineer knows everything about their instrument up to the interface, and then very little beyond that.

In short, the problem with the canonical risk assessment approach is its heavy reliance on SME knowledge of the complex and interconnected cyber environment which is invariably incomplete and error prone. The is also the issue of human memory and ability to constantly maintain awareness of various technical details such as OS (Operating System) versions, application communication ports and protocols, etc., as these technical details evolve with the system over time. This reliance has resulted in risk assessment results that are unreliable and effectively useless in preparing a facility to defend against threats.

CAVE Contribution:

CAVE was used in the Europa project to implement a risk assessment process that was focused, granular and that was able to identify specific project impacts and detailed areas of improvement. A system architecture of the Europa Ground Data System was generated not by reliance on human memory, but rather by combining ground truth system information, network information, along with subject matter expert knowledge. The model improved upon a wholly qualitative dependence on SMEs because the majority of the environment data collected for the model was done so in a near real-time, automated fashion. For example, the system information captured was obtained directly by querying the infrastructure itself and not from SME memory or outdated documentation. The model contained 1) system information, such as open ports, authentication and authorization methods, user groups, firewall rules, and installed applications (obtained using automated scripts), 2) system vulnerability information, identified using credentialed security scans, 3) network component and network connectivity information (obtained via network mappers), 4) mission workflows and identified mission critical applications (obtained from Ground Data System Engineers).

The final model of embodiments of the invention provided a rich environment to conduct analyses that describe, in detail, the impact of attack paths, the prioritization by which vulnerable components should be corrected (e.g., correct those that support critical mission objectives first), a clear identification of the critical/vulnerable mission servers, switches, routers, and so forth.

Training Tool (Intelligence Community (IC))

Problem:

The effective transference of knowledge from experienced SMEs to newer SMEs is a known problem in cyber security. Although experienced SMEs have vast amounts of knowledge about the subject, they tend to have difficulty in explaining how that knowledge combines to perform a task in day to day operations. Furthermore, as older SMEs retire, that knowledge becomes lost to the next class of SMEs as it is often impossible to document knowledge and capability.

CAVE Contribution:

CAVE not only captures the environment in which experienced SMEs work on, but it also records the analyses that are executed by those SMEs and the results. A new SME can follow the actions of an experienced SME in CAVE and can compare their own analyses on the same environment to learn.

Attack Analysis (Attack Tree Analysis) Tool

Problem:

Attack trees are methods that detail how attacks may manifest in an environment. For example, the start of the tree could be the adversary compromising an asset at the coffee shop, and the end of the tree could be adversary exfiltrates sensitive corporate data. Coding of attack trees is difficult because there are not too many frameworks amenable to an action like "compromises laptop at Starbucks".

CAVE Contribution:

CAVEATs (CAVE Attack Trees) are coded versions of the attack trees that can be exercised on the CAVE model. Such a procedure is currently not available on any other vendors' products, and this is mostly because of two reasons: 1) Coding attack trees is a difficult and tedious process (CAVE does not solve this directly), and 2) commercial product vendors do not incorporate both network layer and application or workflow processes concurrently in a single analysis and visualization environment.

Communication Tool (DoD)

Problem:

Communication of cyber security related information to management is often difficult due to the discrepancy between the knowledge base of management vs. the engineers. DoD sponsors are often asked to spend significant amounts of time, which translates to money, generating information that is too technical for them to digest and translate into meaningful, actionable information.

CAVE Contribution:

CAVE's sophisticated visualization engine is engineered for the presentation of cyber data to inform an audience that is not comprised of technical, cyber-security analysts. The visualization environment offers a simplified explanation of a complicated process, and at the same time, the more technical aspects of the description can be brought out as required. Most importantly, it gives the audience an immediate and visceral connection of rough-order-of-magnitudes of system and network size and complexity, which is typically abstracted away.

Host-Based Asset Profiling

Figure 2:
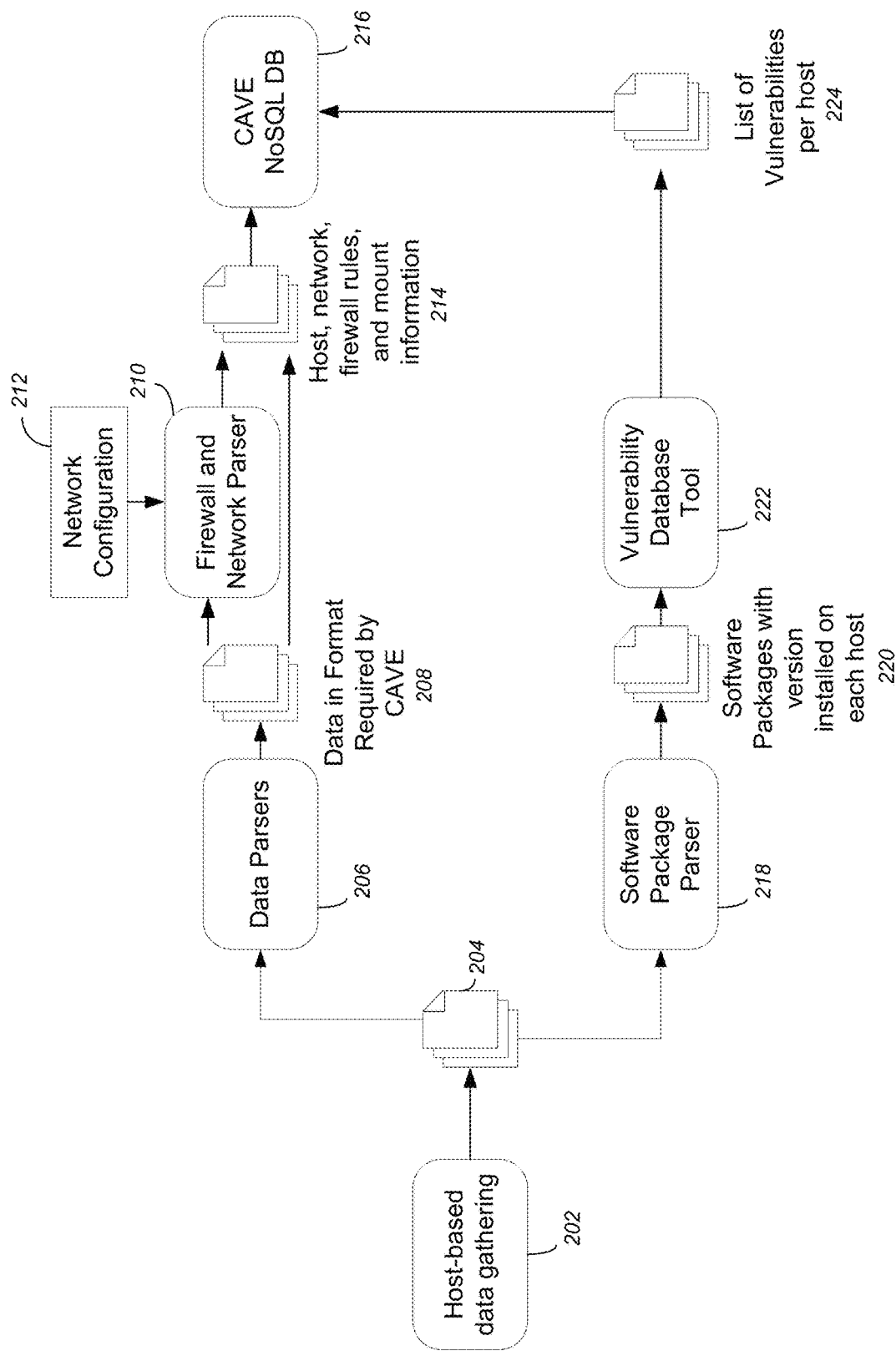
FIG. 2 illustrates a data pipeline for gathering and parsing information necessary for building a system model in accordance with one or more embodiments of the invention.

The gathering of information in step 102 may be performed via host-based asset profiling. FIG. 2 illustrates a data pipeline for gathering and parsing information necessary for building a system model in accordance with one or more embodiments of the invention.

CAVE ingests a variety of data to build as accurate a model of the system as possible given the source data. In addition to ingesting network configuration and common attributes of the end hosts, which may be conducted using tools in network modeling and risk scoring platforms or network security policy management systems (e.g., tools available from REDSEAL and TUFIN), CAVE ingests detailed information gathered from the end hosts. The following types of information may be gathered by lightweight scripts running on an end host, and can be fed through the pipeline of FIG. 2 being ingested into CAVE.

- Distro info, kernel, hostname and interface information
- Open TCP/UDP ports and associated processes
- Operating system and application packages installed on the host (with update/install timestamp)
- Mounted filesystems (local and remote), and disk space information
- Local (host-based) firewall rules
- Authentication mechanisms in use, as configured on the system
  - Configured LDAP servers
  - Groups which have login rights on the server
  - Configured TFA servers
  - Configured Kerberos servers
- DNS configuration
- System uptime (time since last reboot)
- System service configuration
- Process memory usage One may contrast the data collection approach (of embodiments of the invention) with traditional approaches. Traditional modeling tools depend on network-based tools (such as a port scanner) to deduce information about the end hosts. Such tools can only provide a definition of a host as visible to the network, and often miss important attributes of the host which are often not exposed to the network and are impossible to deduce remotely. For example, while a port scanner may reveal open ports on a host, it is impossible for the port scanner to decipher the software applications actually running on a host. This information is accurately available only on the host, but it is critical for building an accurate model of the environment. CAVE's host-based data gathering component allows us to the gain deeper visibility into a host, enabling a more accurate model, and thus accurate analysis results.

Referring to FIG. 2, data is gathered by the hosts at 202. The gathered data 204 is passed through data parsers 206 to format them into a simpler tabular format necessary for CAVE 208. The firewall and network parser 210 reads firewall and network configuration 212 (e.g., either from tools such as those available from REDSEAL and from output of host-based firewalls such as the IPTABLES userspace utility program), performs simple cleanup of the information and formats it to produce host, network, firewall rules, and mount information 214 in a way suitable for reading by a CAVE database 216 (e.g., a noSQL or non-relational database). In addition, the software package parser 218 reads information 204 regarding the installed packages from a host, and output a simple file 220 containing package names and package version numbers installed on the host. This simple file 220 is provided as input to the vulnerability database tool 222, which associates CVE (common vulnerabilities and exposure) information with each of the packages installed on the host (i.e., to produce the list of vulnerabilities per host 224). The vulnerability database tool 222 stores a local, updated instance of the National Vulnerability Database (NVD) content and enables embodiments of the invention to quickly retrieve a list of vulnerable software from a potentially large list of software installed on their machines.

All information gathered and parsed is stored in a NoSQL database for access by CAVE.

Low-Error Vulnerability Identification

Step 104 of FIG. 1 provides for pre-processing the data to identify vulnerabilities that are relevant to the system under consideration. This section provides the details for such a pre-processing.

One form of data ingested by CAVE is CVE information for each host. CVE stands for Common Vulnerabilities and Exposures and is a database of catalogued vulnerabilities found across a wide variety of software programs. Each vulnerability in this database is assigned a unique id, called a CVE ID. A CVE ID uniquely identifies a vulnerability in one or more related software programs. CVE IDs for a particular host are identified by looking up the software package versions installed on the host, and then cross referencing them against the publicly available CVE database. Unfortunately, such a look-up and cross-referencing method has a fundamental drawback—the CVE IDs reported as a result of this process result in a lot of false positives, meaning that it results in identification of vulnerabilities that may not actually exist on the host. This happens due to the fact the public CVE database does not store detailed package versions used by vendors for each CVE. For example, consider software package X. The CVE database may store a vulnerability for software package X version 1.1, whereas the software vendor for X may patch this vulnerability in 1.1 and rename the new version to 1.1-p1. Unfortunately, the CVE database does not store such detailed package information for each vendor, and only stores the major and minor version numbers of the software, in this case the value 1.1. This creates an issue because even though the software may now be patched, any tool which extracts CVEs for a given package can only use the major and minor versions while searching the CVE database. Thus, software X v1.1-p1 will be reported to contain the vulnerability even though it is patched by the vendor. Typically, tools that perform such analysis depend on the user to filter out the false positives but such false positives are in the tens of thousands when applied to a large number of hosts and significantly increases the burden on a user.

Embodiments of the invention provide a unique solution to this problem. Embodiments of the invention involve a methodology that correlates information from the CVE database and vendor specific databases to drastically reduce the number of false positives reported for a given host. This correlation is vendor-specific but drastically improves the quality of CVEs returned by ensuring that only the relevant and active CVEs on a host are returned.

Methodology for Low-Error Vulnerability Identification

For each host on the network, the following steps may be performed:

(1) Gather package and version information from the host;

(2) Given the package and version information, search the locally stored NIST NVD (National Vulnerability Database), and generate a list of CVEs relevant to the host;

(3) Cross reference the list of generated CVEs with information from vendor specific databases (such as the RED HAT SECURITY DATABASE) to eliminate CVEs which are already patched or do not apply due to vendor specific corrective actions. This step has consistently resulted in elimination of around 70-80% of CVEs, generated in the previous step.

Within step (3), for each CVE, program, and version:

(a) Find the installed package corresponding to the program and version;

(b) Gather all packages corresponding to the CVE—if no package found, log an error and continue;

(c) Parse the installed package name to extract detailed components such as name, version, release and architecture.

(d) Compare the program and version number with the information extracted in previous step. If there is no match, the CVE is added to a false positive list and the number of false positives is increased. Else, the CVE is added to a true positive list and the number of true positives is incremented;

(4) Output the list of true positives as the valid CVEs for the host.

Model Generation

Step 106 provides for the automatic generation of a model of the cyber environment capturing the necessary attributes and dependencies. This section describes the details of step 106.

Figure 3:
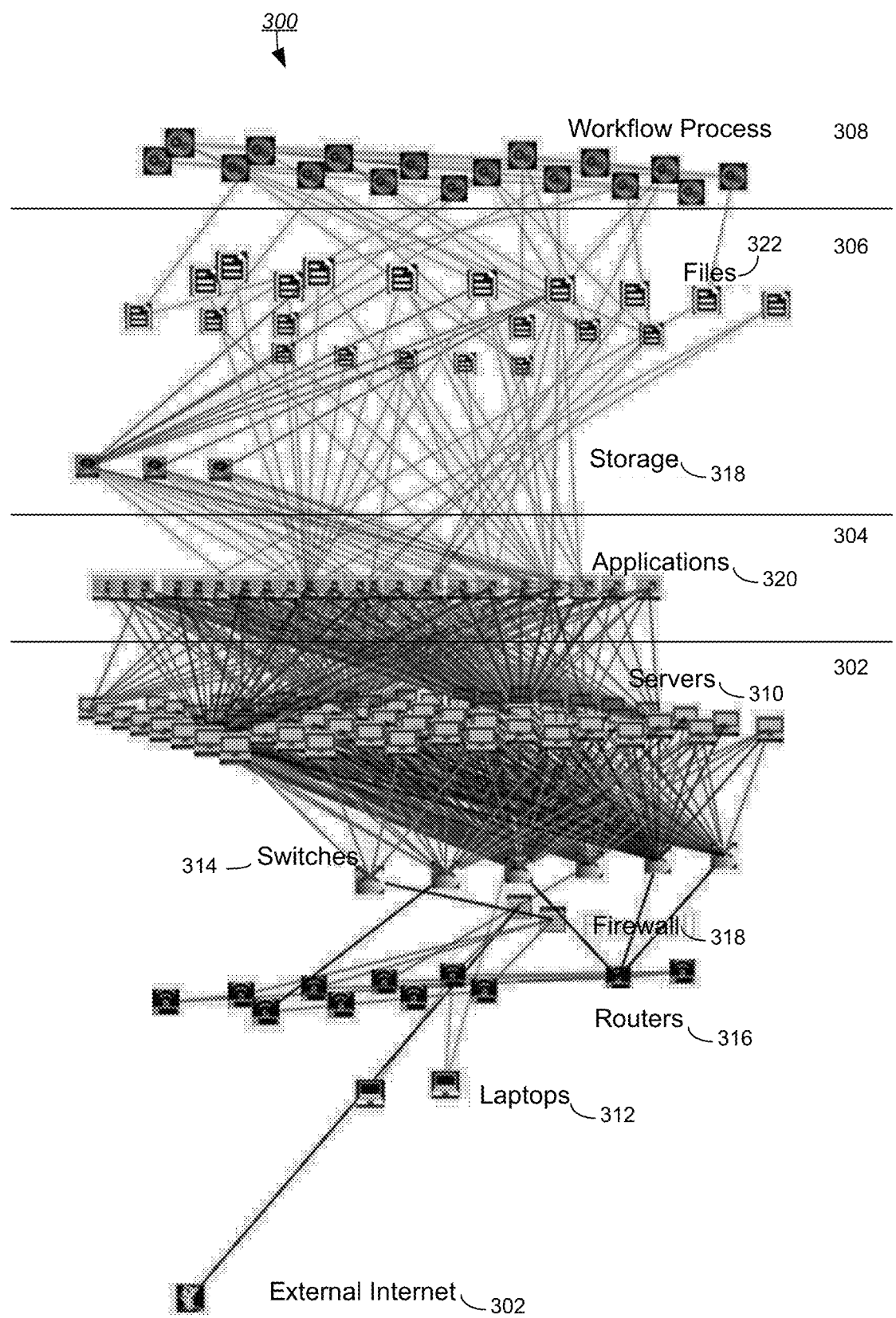
FIG. 3 illustrates a system model used by CAVE in accordance with one or more embodiments of the invention.

FIG. 3 illustrates a system model used by CAVE in accordance with one or more embodiments of the invention. The model 300 is utilized to capture multiple levels of system information.

A key input to a process of embodiments of the invention is a system-model 300 containing multiple layers of system information. A graph-based approach may be utilized to model the system entities and relationships between those entities. The model 300 can be broken up into four (4) abstract layer types: Hardware 302, Software 304, Files 306, and Workflow Processes 308. A Workflow Process 308 represents an individual mission task that contributes to the larger mission goal. For example, if the mission goal is to a command a spacecraft then a workflow process 308 for that mission goal would be create command files. The Hardware layer 302 can be further refined into the individual types that make up the hardware infrastructure of a typical enterprise network such as Servers 310, Laptops 312, Workstations, Switches 314, Routers 316, and Firewalls 318. Working from the top down, the Workflow Process 308 layer consists of high-level mission goals or objectives, the File layer 306 consists of data (e.g., files 322) that support those Workflow Processes, the Software layer 304 consists of applications 320 that support those data products or a Workflow Process. For each unique Hardware 302, Software 304, File 306, and Workflow Process 308 there exists a vertex in the graph 300.

Associated with each vertex are attributes which make up the properties of the model. For example, to each server 310 vertex we can associate the Hostname, IP address, OS (operating system), Groups, Users, and/or Authentication schema. The attributes can be adjusted to the unique needs of each different enterprise network. Table A lists typical attributes to the layers from above.

TABLE A

| Type | Attributes |
| --- | --- |
| Laptop 312 | Name, OS, Applications, Group, Username, CVE IDs |
| Server 310 | Name, IP, Subnet, OS, Application, Group, Username, Ports |
| Application 320 | Programming Language, Common Weaknesses (CWE) IDs |
| File 322 | Format, Permissions |

It should be noted that the Software layer 304 may not include all the applications installed on the servers 310, but only those applications that support other layers 304-308. However, the applications installed on the system do have an impact on the security posture, e.g., software vulnerabilities, so third-party applications are included as attributes to Server 302 vertices. The components of the network provide vertices of a graph, the edges of the graph are specified by connections between the different components. The edges between the hardware components are given by the direct physical or virtual connections. The connections between the other layers are compositional. For example, an edge will exist between a server 310 and a software/application 320 vertex if the software/application 320 is installed on the server 310. A directed edge between a software/application 304 vertex and a file 322 vertex will exist if the file 322 is either an input of the software/application 320 or an output of the software/application 320, where the source of the edge is the input and the target is the output. Similarly, an edge exists between a workflow process 308 and another vertex if that vertex is either an input to the workflow process 308 or an output of the workflow process 308. In this way, the system model inherits a directed graph structure.

Semantically Relevant Query Language

Step 108 provides for converting salient features (from high-level cyber threat reports) to semantically relevant queries over the model. In this regard, CAVE presents a novel, semantically-relevant approach for a user to query the information contained in the system models. CAVE uses the underlying reasoning engine (described in the next step) to interface with the data contained in the models, resulting in a very high-level, domain-specific, semantically relevant language for queries. For example, a user can query for "does machine X have port Y open?" with a simple construct such as has_port_open(X,Y), as opposed to writing a tedious database query in the language of the underlying database. Further, since embodiments of the invention provide for queries that are written over the underlying reasoning framework, queries can be easily composed into complex queries using the same constructs offered by the reasoning framework and saved for future use. This ability to quickly compose abstract queries in a semantically relevant syntax allows users to quickly express complex analyses tasks at a very high-level of abstraction. For example, a high-level query such as has_vulnerable_path(H1, H2), where H1 and H2 are two hosts on the network, is composed of several lower level queries which deal with finding network paths, evaluating access controls, and understand host vulnerabilities. Such complex compositions are typically hard or even impossible to do using standard database queries such as those available in MySQL or NoSQL databases. The semantically relevant query capability results from declarative logic programming interface provided by the reasoning engine. Details of the underlying reasoning engine and the interface are discussed further in the next section.

Reasoning Across Multiple Levels of the Enterprise Architecture

Step 110 of FIG. 1 provides for reasoning over the model to generate answers relevant to the query. This section explains some of the actionable intelligence for the answer generation.

CAVE provides a novel logic-based reasoning framework for automatically compiling the context and evidence about cyber vulnerabilities in complex mission critical environments. The framework leverages a deductive reasoner based on first-order predicate logic and provides a declarative logic programming interface. Information about the system is first input as facts in the framework. System experts provide high-level rules to operate on the facts, and reasoning occurs by logical deduction over rules and facts. The framework allows a decision maker (such as a system administrator, designer or engineer) to interact with the model of a complex system, and pose semantically relevant queries to reason about system vulnerabilities. For example, given a system model, a decision maker may want to understand all the ways in which an adversary, possibly sitting on a laptop connected to the wireless network, could potentially access critical system files on mission servers.

Figure 4:
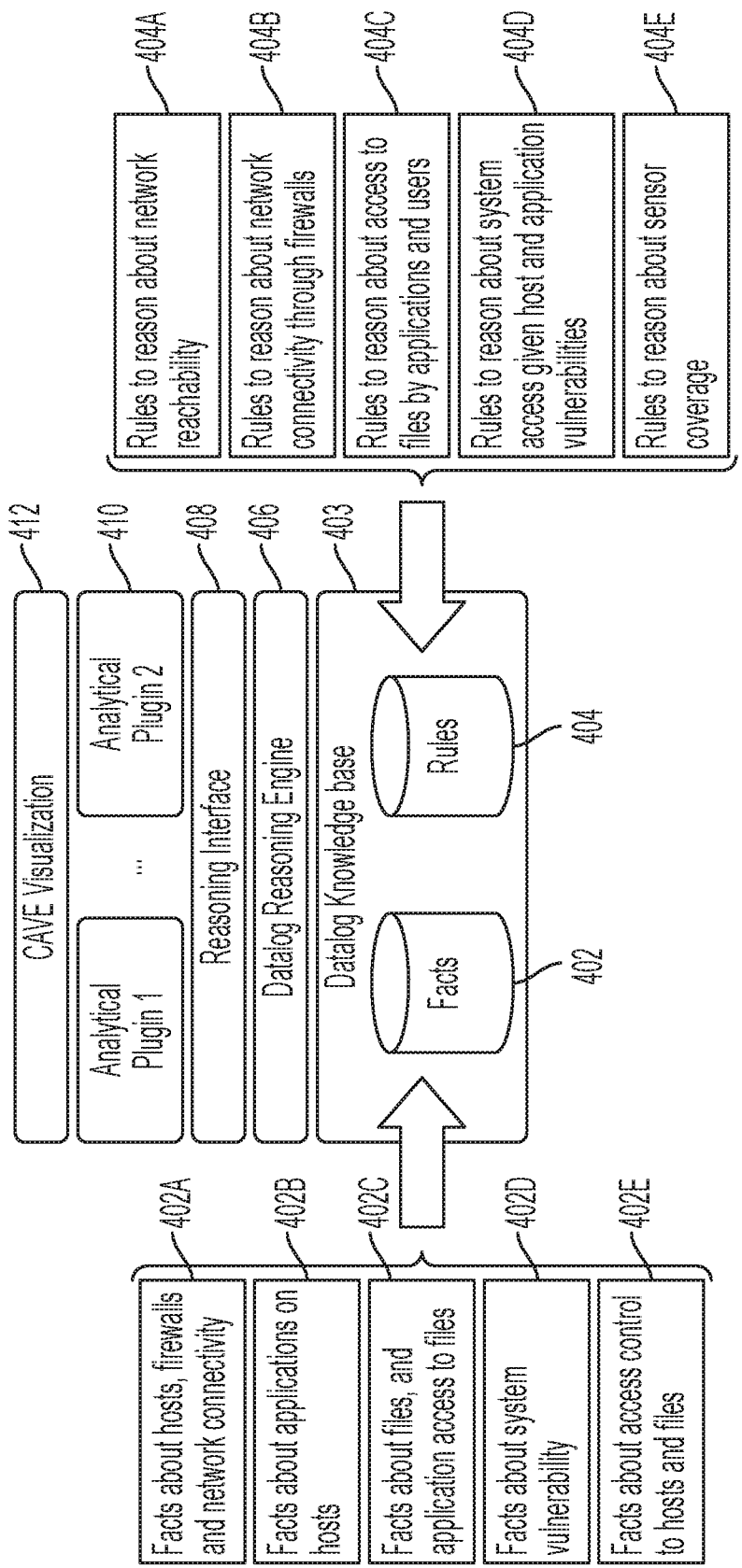
FIG. 4 illustrates a high-level architecture of the reasoning engine and its relationship to other components in accordance with one or more embodiments of the invention.

FIG. 4 illustrates a high-level architecture of the reasoning engine and its relationship to other components in accordance with one or more embodiments of the invention.

Reasoning Over the System Model

The system model of FIG. 4 is used to extract facts 402 about the system, which are used to bootstrap the reasoning framework (e.g., by storing such facts 402 in a (DATALOG) knowledgebase 403). A framework may support one or more of the following types of facts 402 about the system:

Facts 402A about hosts, firewalls and network connectivity;

Facts 402B about applications on hosts;

Facts 402C about files, and application access to files;

Facts 402D about system vulnerability (CVE information); and

Facts 402E about access control to hosts and files.

Table B illustrates a list of all the key facts expressed as DATALOG predicates.

TABLE B

| | Facts | Description |
|---|---|---|
| Facts about hosts and network connectivity | logical_network_link(nodeA, nodeB) | Expresses a logical connectivity between two network nodes A and B. |
| | port_open(nodeA, portP) | Specifies an open port on node A |
| Facts about Files | file_stored_on_node(nodeA, fileF) | Specifies file F stored on node A |
| | files_touched_by_application(appA, FileF) | Specifies if appA interacts with File F |
| Facts about access control to hosts and files | role_allowed_login_on_node(nodeA, roleR) | Specifies the role allowed login on node A |
| | role_allowed_file_read(roleR, fileF) | Specifies the role to read file F |
| | role_allowed_file_write(roleR, fileF) | Specifies the role to write to file F |
| Facts about host applications | application_on_node(nodeA, appB) | Specifies an application B on node A |
| Facts about system vulberability | node_cves(nodeA, cveB) | Specifies CVEs on node |
| | cve_attributes(cveA, attB, valueC) | Specifies attributes of CVEs |

As illustrated in Table B, facts 402A may be expressed as logical_network_link(nodeA, nodeB) to express a logical connectivity between two network nodes A and B. Further, facts 402A may also be expressed as port_open(nodeA, portP) to specify an open port on node A. Table B illustrates the remaining facts 402B-402E and how they can be expressed in various DATALOG predicates (i.e., defined by facts).

The next key component of the reasoning framework are the rules 404 (e.g., also stored in (DATALOG) knowledgebase 403), that are written by system experts to operate over the lower-level facts 402, combine them into higher-level facts, and in general capture high-level domain semantics. For example, network_link(A,B) is a fact which captures the information about nodes A and B being connected, while has_network_path(X,Y) is a rule which is used to compute a path between any two nodes in the system. A framework of embodiments of the invention may have the following types of rules 404:

Rules 404A for defining network relationships;

Rules 404B for defining network connectivity through firewall constraints;

Rules 404C for defining how applications access files on a system;

Rules 404D for defining how users access files on a system, and access control policies; and Rules 404E for defining how cyber sensors may be placed in an environment.

Reasoning then occurs in the framework (e.g., via a (DATALOG) reasoning engine 406) by logical deduction over the rules 404 and facts 402. A deductive first-order logic-based reasoning approach may be utilized. The logic programs (encoding of facts 402 and rules 404), may be written (e.g., via a reasoning interface 408) in the DATALOG programming language, which is a lightweight subset of the PROLOG programming language and is a popular choice for implementing expert systems.

As illustrated in FIG. 4, a decision maker may have the ability to interact with the model via the CAVE visualization 412 that includes various analytical plugins 410 that interact with the reasoning interface 408.

Table C illustrates an example rule to define simple service reachability

TABLE C

```
can_reach_service(Src,Dest,Proto,Port) <=
logical_network_path_exists(Src,Dest)&\
        f_port_open(Dest,Proto,Port)
# Finds if a logical path exists between X and Y
logical_network_path_exists(Src,Dest) <=
logical_network_path_exists(Src,Z) &\
        f_logical_network_link(Z,Dest) & (Src != Dest)
logical_network_path_exists(Src,Dest) <=
f_logical_network_link(Src,Dest)
```

Table D illustrates an example rule to define network connectivity via a firewall.

TABLE D

```
has_network_path(Src, Dest, Port, Proto, Paths) <= \
    all_logical_network_paths(Src, Dest, Paths) & \
    firewall_allows_access(Paths, Src, Dest, Port, Proto)
```

Figure 5A:
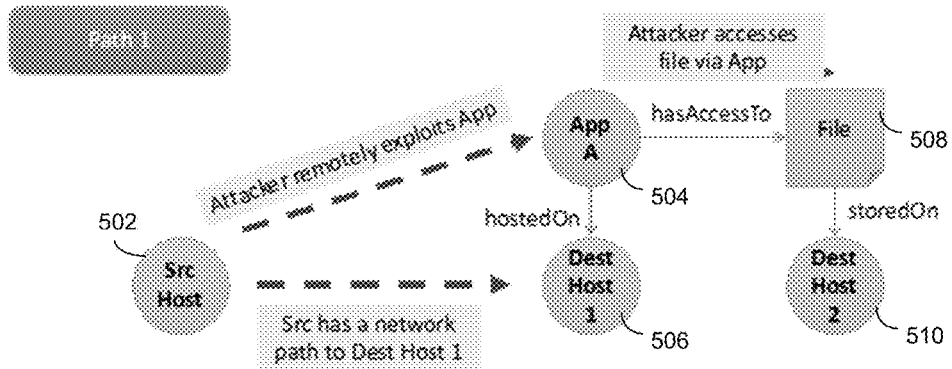
FIGS. 5A-5C visually show all the high-level paths for an attacker to access a file on the network in accordance with one or more embodiments of the invention.
Figure 5B:
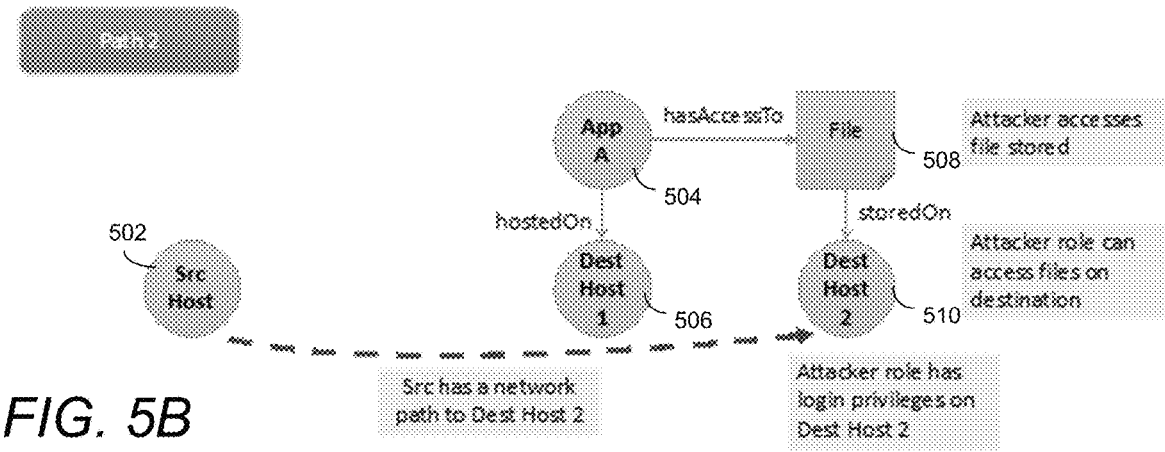
Figure 5C:
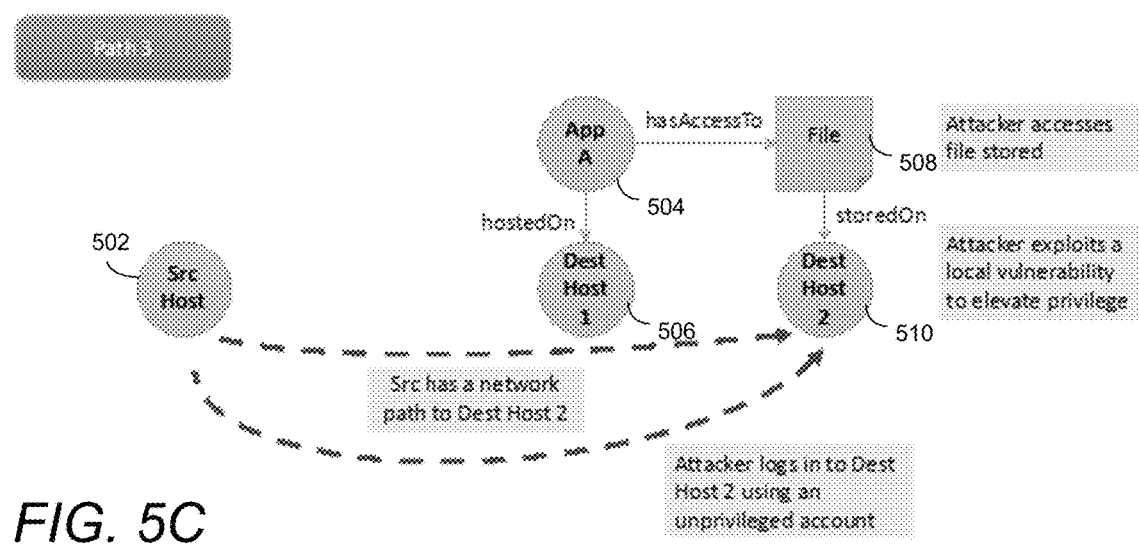

FIGS. 5A, 5B, and 5C and Table E below illustrate an additional example of how a file access can be represented in our framework in accordance with one or more embodiments of the invention.

FIGS. 5A-5C visually show all the high-level paths for an attacker to access a file on the network in accordance with one or more embodiments of the invention. In Path 1 illustrated in FIG. 5A, through a source host 502, the attacker remotely exploits AppA (that is hosted on destination host 1 506) through which the attacker gains access to file 508 that is stored on a destination host 2 510. The source host 502 may also have a network path to destination host 1 506.

In Path 2 illustrated in FIG. 5B, the source host 502 has a network path to the destination host 2 510 in which the attacker role has login privileges. Accordingly, the attacker role can access files on the destination host 2 510 and thereby access files 508 stored on the destination host 2 510.

In Path 3 illustrated in FIG. 5C, the source host 502 has a network path to destination host 510 and the attacker logs into the destination host 2 510 using an unprivileged account. Such a login is based on the attacker exploiting a local vulnerability that elevates the attacker's privileges. Thereafter, the attacker can access the file 508 stored on the destination host 510.

All the paths of FIG. 5A-5C are then easily encoded into our framework as rules as shown in Table E.

TABLE E

```
# Case 1
# ---
# A user (as role R) on host X logs in over the network to host Y,
# and reads the file F through an application Z which has read rights
# to the application.
path_for_role_read_file(Src,File,Role,Paths,App) <= \
        has_network_paths(Src,Dest,22,'tcp',Paths) \
        & f_role_allowed_login_on_node(Dest,Role) \
        & f_application_on_node(Dest,App) \
        & f_role_allowed_login_on_application(App,Role) \
        & f_files_touched_by_application(App,File) \
        & f_role_allowed_file_read(Role,File)
# Case 2
# ---
# A user (as role R) on host X logs in over the network to host Y,
# and reads the file F if the role has read permissions.
path_for_role_read_file(Src,File,Role,Paths,App) <= \
```

TABLE E-continued

```
        has_network_path(Src,Dest,22,'tcp',Paths) \
        & f_role_allowed_login_on_node(Dest,Role) \
        & f_file_stored_on_node(Dest,File) \
        & f_role_allowed_file_read(Role,File)
# A user is on a machine which has an app that can access the needed file.
can_role_read_file_at_node(Src, File, Role, App) <= \
        f_application_on_node(Src, App) \
        & f_role_allowed_login_on_application(App,Role) \
        & f_files_touched_by_application(App,File) \
        & f_role_allowed_file_read(Role,File)
# A user is on a machine which stores the file in local file store.
can_role_read_file_at_node(Src, File, Role) <=
        f_file_stored_on_node(Src, File) \
        & f_role_allowed_file_read(Role,File)
# Case 3
# ---
# A user (as role R) on host X logs in over the network to host Y which
# has a network accessible admin vulnerability and reads the file F
# through an application Z which has read right to file F.
vulnerable_path_for_role_read_file(Src,File,Dest,CVE,Port,
Paths,App) <= \
        remote_admin_privilege_escalation(Src, Dest, Port,
CVE, Paths) \
        & f_application_on_node(Dest,App) \
        & f_files_touched_by_application(App,File)
```

The approach demonstrated in Table E results in smaller, less error-prone programs, in comparison to writing pages of computer code in a language such as PYTHON. Further, our declarative logic programs are written at a semantically-relevant higher-level which enables fast, relevant analysis that is also exceptionally flexible.

Uncertainty Calculus

Embodiments of the invention may further provide a unique addition to the reasoning layer to assist an analyst's decision making. CAVE introduces a novel uncertainty calculation engine (e.g., within (DATALOG) reasoning engine 406) that computes the confidence in a particular analysis performed by the reasoner. Often times, data used for a particular analysis by the reasoner may be incorrect, incomplete, inaccurate or simply stale for a variety of reasons, and which may ultimately affect the analysis results. For example, firewall rules over a month old may not accurately reflect the state of the network, and analysis performed using this data may result in misleading output from the reasoning engine. Similarly, data gathered using automated means (say a script determining the IP address of a host) may be more accurate than data that is gathered by reading documentation. The quality of underlying data thus affects the analysis, and an analyst needs to understand how much he or she can trust the results output by the reasoning engine 406 for effective decision making. CAVE introduces a novel yet simple methodology for conveying the confidence in a particular analysis by factoring in the confidence in the underlying data facts used for the analysis. The uncertainty engine introduces two novel features:

1. A methodology for assigning confidence scores (a number between 0 and 1) to individual facts, and
2. A methodology for combining the low-level confidence scores into a confidence score for the overall analysis.

Methodology for Assigning Confidence Score to Individual Facts

Each fact $F_i$ 402 in the CAVE model is assigned a confidence score between 0 and 1. The confidence score is dependent on a variety of factors $f_1, f_2, \ldots, f_n$. For example, the confidence score for the fact ip_address(A, 10.1.1.1) depends primarily on the factor for the source of information, that is, for example, was the information collected by a script, from an external database, or from a design document. Information collected by a script has a higher-level of confidence than information collected from a design document that may be less reliable.

Figure 6:
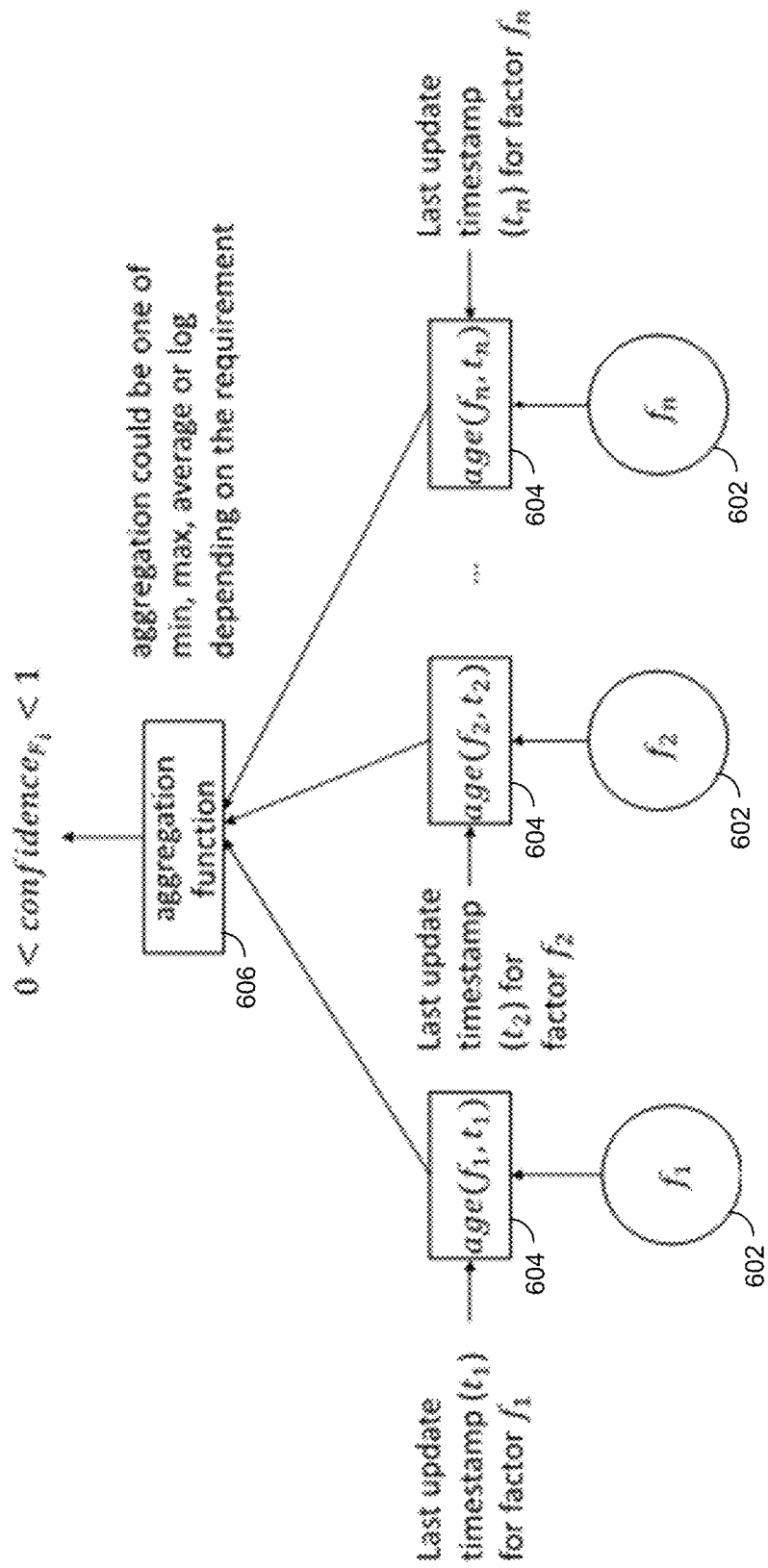
FIG. 6 illustrates the process for computing the confidence score of a fact F in accordance with one or more embodiments of the invention.

FIG. 6 illustrates the process for computing the confidence score of a fact F in accordance with one or more embodiments of the invention.

Each factor ($f_1, f_2, \ldots f_n$) 602 is further passed through an age function 604, that computes the value of the information given the age of the information. This allows the ability to accurately estimate the impact of stale information on the analysis results. The generic age function 604 for a factor 602 is as below $$age_{factor}(A, t) = \begin{cases} A, & t \le c \\ A * e^{-\lambda t}, & t > c \end{cases}$$

In the above equation, A is the value of the factor 602, and t is the timestamp at which the factor value was last updated. C is a constant (measured in days) that captures the length of time for which the factor's value does not decay. For example, an IP address's value may be good for 14 days before it needs to be updated. After 14 days, the confidence in the value would start decaying at an exponential rate. The C value must be assigned separately for each factor 602 in the framework. The value of lambda ($\lambda$) is usually set globally in the framework, but can also be set for each fact.

Figure 7:
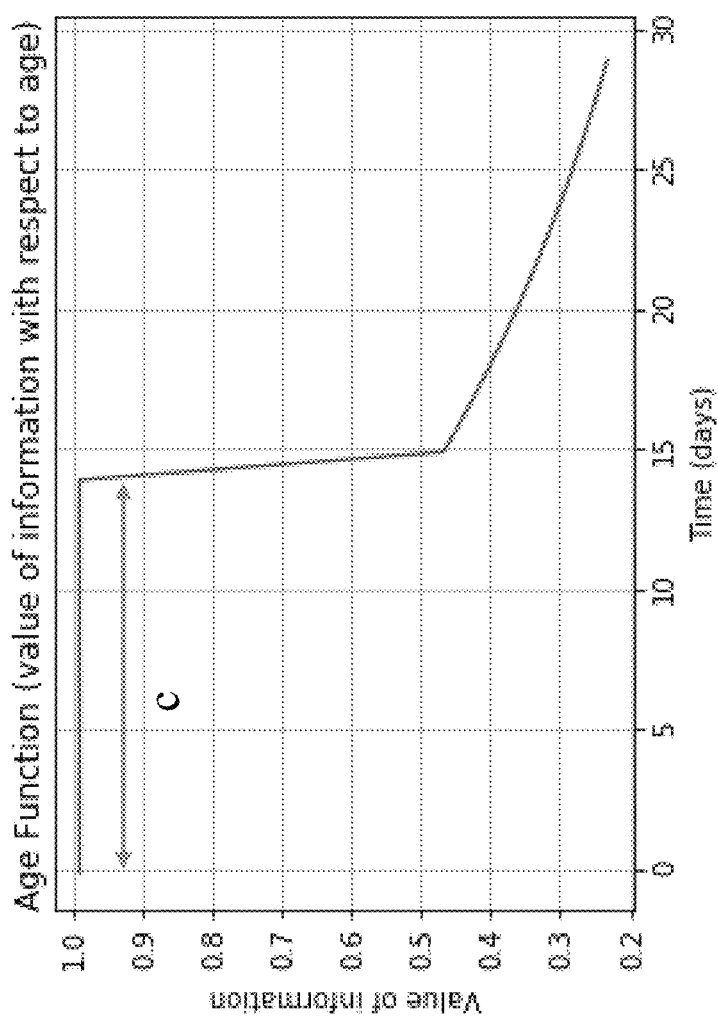
FIG. 7 illustrates a graph of the behavior of the age function over time in accordance with one or more embodiments of the invention.

FIG. 7 illustrates a graph of the behavior of the age function over time in accordance with one or more embodiments of the invention. As illustrated, the value of information is maintained for the first C days, then it exponentially decreases as time passes. For example, if the confidence score of an IP address (gathered by a script) was 0.99, it stays 0.99 for the first 14 days, then it would drop to 0.46 on the 15$^{th}$ day.

A framework of embodiments of the invention allows for a different age function to be assigned to each factor if so desired.

Referring back to FIG. 6, once the values for all factors 602 are computed and passed through the age functions 604, the scores are then aggregated to come up with a final confidence score for the fact. The aggregation function 606 could be one of min, max, average or mean, and is chosen on a fact-by-fact basis. The output of the process is a score between 0 and 1 which indicates the confidence in the accuracy of the fact.

Combining Fact-Level Confidence Scores into a Higher Level

Score for an Analysis

Once individual facts are scored, they need to be combined in a meaningful way when deriving a value for the confidence score of an analysis. For example, if one is finding a path between Server A and Server B, then the confidence in the output path depends on some aggregation of all the confidence scores of the low-level facts used in the analysis. Let A denote a high-level analysis, and F denote the set of all the facts $F_1, F_2, \ldots, F_k$ used in the analysis. Let $C_1, C_2, \ldots, C_k$ be the confidence scores of each of the individual facts used in the analysis. Then, the confidence score for the analysis $C_A$ may be computed as follows.

$C_A$ is denoted as $\mu \pm v$, where $$\mu = \frac{1}{k}\sum_{i=1}^{k} C_i$$

$$v = \frac{1}{k}\sum_{i=1}^{k} (C_i - \mu)^2$$

For example, if an analysis depended on facts with confidence scores [0.99, 0.99, 0.8, 0.99, 0.99], the confidence score for one analysis is $C_A$=0.952±0.0057. Note that one may consider each fact to be weighed the same in the computation of analysis scores, but the framework can easily support weighted versions of the above formulas.

In view of the above, the reasoning step 110 of FIG. 1 may include utilizing the system characteristics and system information as one or more facts, accepting rules to operate on the facts, and conducting the reasoning using logical deduction over the rules and facts. Further, for each of the generated answers (resulting from the reasoning at step 110), each of the facts are assigned a confidence score that is dependent on various factors. For each fact, the assignment of the confidence score includes passing each of the factors through an age function (that computes an age value confidence, for each factor, with respect to age), aggregating the age value confidences for all factors to determine the confidence score for the fact, and combining the confidence scores for all facts to determine an analysis score for the generated answer. In addition, the answers may be ranked by the confidence scores and the ranking may be used to select one or more of the answers.

Threat Modeling and Simulation

Step 112 of FIG. 1 provides for executing high-level attach models of the system model to generate comprehensive actionable intelligence (e.g., for an analyst). This section describes some additional details for step 112.

Overview

A threat model can be described using an attack tree. An attack tree is a connected tree where the root node is the objective of the attacker. The ancestors of the root node represent sub-goals that must be completed to achieve the objective. In general, the attack tree is written in a way that is agnostic to a specific model. Hence, the attack tree must be encoded by the SME with model attributes. The attack tree data is then sent to a threat model simulation engine that translates the attack tree data into a sequence of queries that are processed by the reasoning engine. These queries are formed via the model attributes on each leaf node of the tree and how an attacker would move or pivot from leaf node n to leaf node n+1. Upon completion of the simulation the user is presented with the queries, representing the different attack campaigns, that were run on the model. The user is not only presented with the campaign strategy, but statistics for that campaign strategy such as total cost, uncertainty score (e.g., described above), number of model paths that realize that campaign, and number of CVEs. This allows the user to decrease the number of results and focus on those paths that are most critical.

Details

One approach to assessing the security of a system involves analyzing adversarial behavior and strategy. Threat modeling provides a means to understanding the security, or lack of security, in a system, along with the costs and risks associated with the levels of security. Through threat modeling, analysts can understand what the attack goals are, characterize who the attackers are (in terms of their motivations, levels of access, skill, and risk aversion), calculate the likelihood of certain attacks, understand security assumptions made when designing a system, and understand where to best allocate resources to alleviate security threats. Attack trees are a popular method of modeling cyber security threats.

Attack trees are multilevel conceptual diagrams that illustrate how an asset, target, or process may be attacked. They enumerate all possible paths that an adversary might follow to achieve a high-level objective. Attack trees allow one to build a knowledge base to describe the security of a system. They combine and capture security and systems' engineers' expertise, thus providing systems engineers with tools to make decisions regarding system security. Graphically, they are represented as a directed rooted tree such that the orientation of the edges is away from the root. To better understand attack trees, a description of the terminology relevant to an attack tree followed by an explanation of how attack trees are used to model threats is useful.

Terminology

An attack tree broadly consists of one root, leaves, and children. The root node is an adversary's high-level objective; it is the only node within the tree that does not have a parent node. When an attacker has reached the root node, all sub-nodes of the root have been satisfied and the attack has completed successfully. The root node has an in-degree of zero. A node v is a child node of a node w if node w immediately precedes node v on the path from the root node to v. The node w is said to be the parent of node v. Each parent node contains a Boolean expression (AND or OR) to describe the children nodes. This Boolean expression will be called a condition. If the parent node is labeled AND, each child node state must be satisfied to reach the parent node. If the parent node is labeled OR, only one child node state must be satisfied to reach the parent node. Embodiments of the invention have constructed the trees in such a way that every child of a parent node is of the same condition (i.e. AND: all children must be satisfied; OR: only one child must be satisfied). One may assume, therefore, that a parent will never have a mix of child conditions to satisfy.

A group of nodes are siblings if they have the same parent node. A group of nodes are independent siblings if they are siblings and their parent is a conditional OR. A group of nodes are conditional siblings if they are siblings and their parent node is a conditional AND. An internal node is a node with an out-degree greater than zero. A leaf node is a node with no children. An entry node is a node from which an attacker can begin an attack path to the root node. Entry nodes are always leaf nodes (though not all leaf nodes are entry nodes). If the parent node of a leaf node is labeled OR, the leaf node is an entry node. If the parent node w of a group of siblings is labeled AND, such that every sibling is a leaf node, then the leftmost sibling is an entry node. No other siblings within that group are entry nodes.

Modeling Threats With Attack Trees

Attack trees have been used to understand several different aspects of risk, such as threats to physical systems, threats that tamper with electronics systems and threats on computer systems. Embodiments of the invention focus on attack trees that outline how to compromise computer control systems. In general, a two-step process may be used to model threats: (1) given a high-level attacker goal, construct an attack tree; and (2) annotate the attack tree for execution over the system model.

Attack Tree Construction

The high-level attacker goal becomes the root of the attack tree. For example, if an attacker's ultimate goal is to compromise a spacecraft, the root of one attack tree may be titled "Compromise Spacecraft". The root node is then decomposed to construct broad subgoals from there. These subgoals, for example, may include nodes describing how to compromise the spacecraft, such as "Disrupt radiating dish" and "Tamper with commands files radiated to the spacecraft"; and nodes describing circumventing getting caught before successfully compromising the spacecraft, such as "Anonymize identity of spacecraft compromiser." Each of these subgoals have subgoals of their own, except the leaves of the attack tree. The nodes are considered general nodes for many reasons, chief among them being reusability. The attack trees may be applied to several spacecraft computer control systems, as well as to industrial control systems. For example, an attack tree to "gain command and control of spacecraft Y", at a high-level will be similar to an attack tree to "command and control spacecraft X".

Attack Tree Annotation

In the second step, the trees are annotated with properties that would link them to a more detailed graphical representation of the system. This will be further discussed below. One of the main difficulties in executing an attack tree on a system model is that the language of an attack tree is written in conversational English. Moreover, the shorthand notation will differ between authors of the attack tree. Therefore, in the second step, leaf nodes of the attack tree are annotated with attributes contained in the system model. Recall, the leaf nodes of an attack tree represent the actions of the adversary on the system and the internal nodes represent the consequences of those actions, hence it is sufficient to annotate only the leaf nodes. The annotation will allow the leaves of the attack tree to be mapped to assets within the system.

Example Threat Model to Command & Control a Spacecraft

In this section, a fictitious ground system for a spacecraft is presented, followed by an annotated attack tree-based threat model for command and control of the spacecraft by an adversary.

Figure 8:
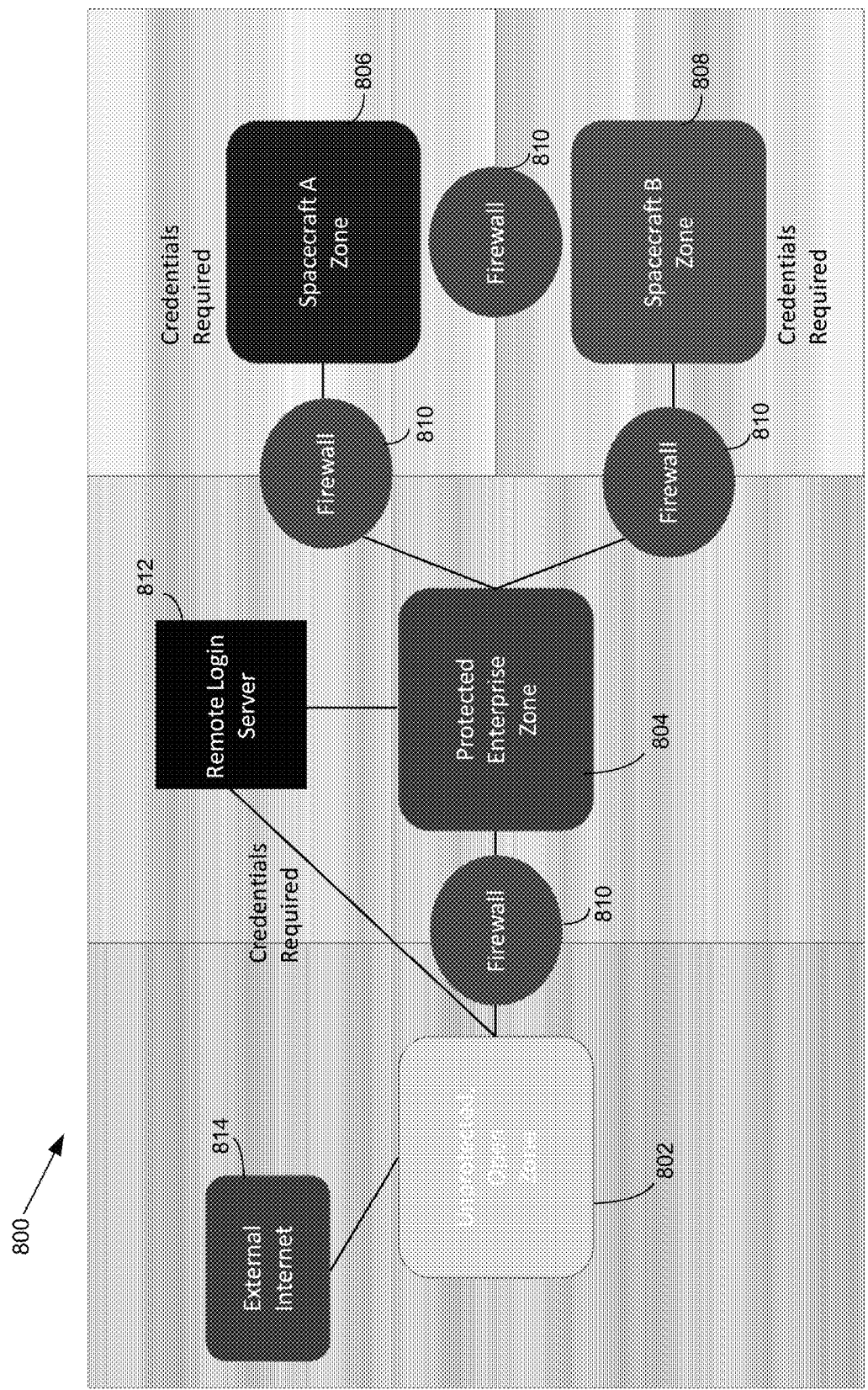
FIG. 8 illustrates an exemplary spacecraft system in accordance with one or more embodiments of the invention.

FIG. 8 illustrates an exemplary spacecraft system in accordance with one or more embodiments of the invention. In particular, FIG. 8 illustrates a fictitious spacecraft command & control system showing the key network zones, and firewalls to protect data flows between zones. The spacecraft computer control system 800 consists of a collection of servers in various zones 802-808 (a zone is a collection of subnets) with differing levels of protection.

Spacecraft-specific zones 806-808—Servers located within spacecraft-specific zones 806-808 (for example, "Spacecraft A" 806, and "Spacecraft B" 808), have varying functions. Some servers run applications to generate data needed for command generation and execution, some servers act as storage databases, and some servers exist to have redundancy in the control system. In spacecraft specific zones 806-808, some servers are inaccessible unless a user is physically within the organization, connected to the spacecraft-specific network zone 806-808, and the user has permission to access that server (e.g., credentials may be required). These servers are protected by a zone firewall 810. Spacecraft command files for that mission are stored within a database on these protected servers. The spacecraft command files have access control and have multiple integrity checks. After verifying these checks, an operator will queue the spacecraft command files to be radiated to the spacecraft.

Protected enterprise zone 804—Servers within the protected enterprise zone 804 are accessible through the enterprise network. Employees within the enterprise network have remote login capabilities (e.g., via remote login server 812). Firewalls 810 may prevent access but for through the remote login server 812.

Unprotected open zone 702—Servers located within the unprotected zone 802 are internet-facing so that they can be accessible by foreign partners 814 for collaborative purposes.

Figure 9:
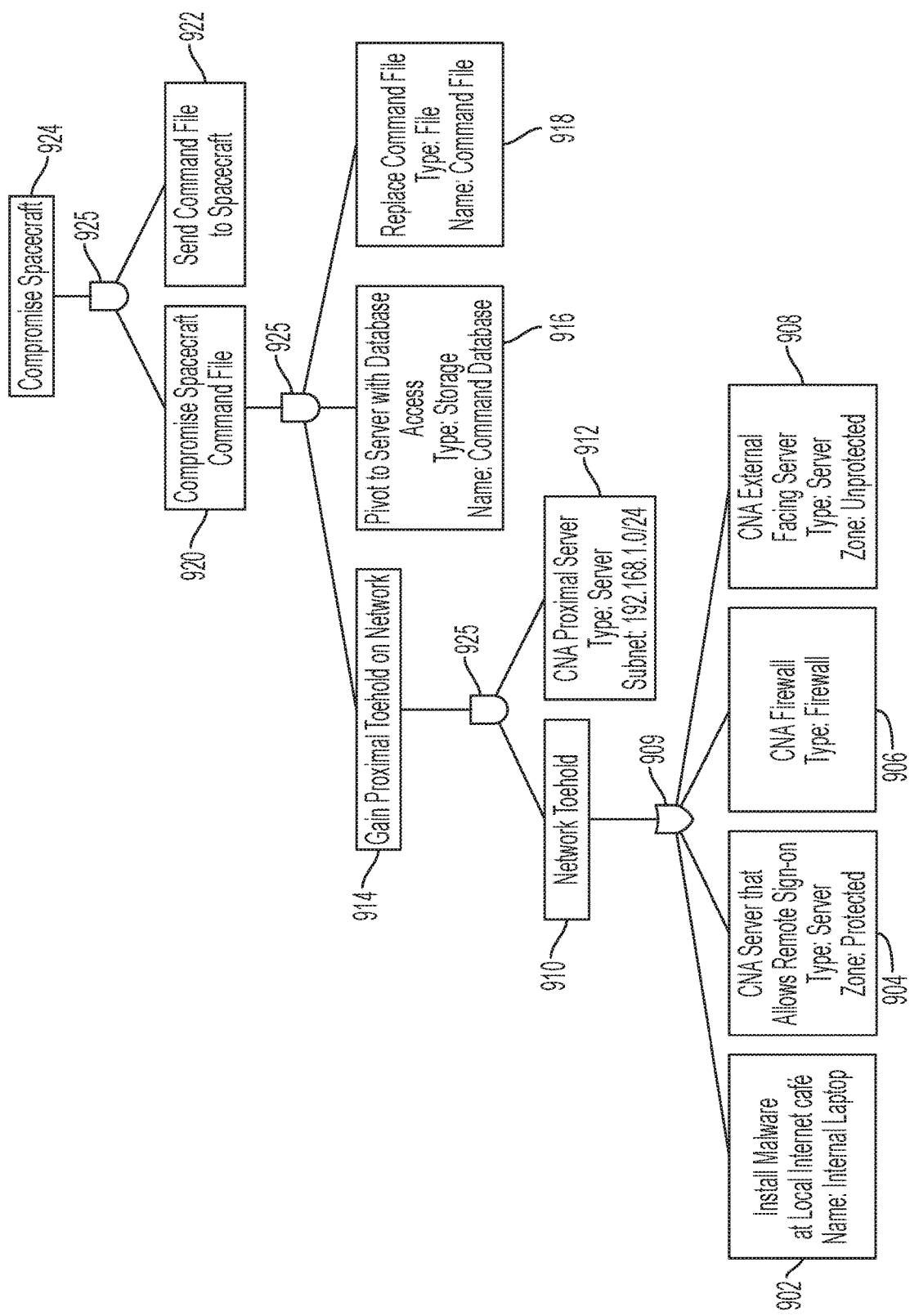
FIG. 9 illustrates an annotated exemplary attack tree for the command and control of spacecraft in accordance with one or more embodiments of the invention.

An exemplary threat model demonstrates how an attacker tries to move through these system zones 802-808 described above, to accomplish his/her malicious objectives. The description below refers to FIG. 8 and FIG. 9. FIG. 9 illustrates an annotated exemplary attack tree for the command and control of spacecraft in accordance with one or more embodiments of the invention. As illustrated, there are four entry nodes: "Install malware at local internet café" 902, "CNA Server that Allows Remote Sign-on" 904, "CNA Firewall" 906, and "CNA External Facing Server" 908. An attacker can choose any of these 902-908 as entry points to accomplish a computer network attack (CNA) to gain a toehold 910 into the protected enterprise network. Let's say the attacker chooses to "Install malware at local internet Café" 902. This attack preys on the fact that enterprise employees have and use mobile devices (e.g. laptops, phones, tablets) on untrusted networks outside of work. As noted in FIG. 9, 902-908 are connected via an "OR" combinator 909 indicating that any of the attacks will suffice to move up the attack tree. The other combinators 925 are "AND" combinators.

The attacker will need to install malware on an enterprise machine through an untrusted network (e.g., in unprotected open zone 802). Once malware is installed onto the machine, the attacker will wait until the employee (owner of the mobile device) returns to work. There, the employee will connect to the protected zone 804 (e.g., via CNA proximal server 912), and malware will have permeated to a device on the protected zone 804 (e.g., the user will have gained a proximal toehold on the network 914). Once within the protected network zone 804, the attacker will try to access and attack a server in the spacecraft-specific zone 806-808. Specifically, the attacker will need to attack a server with access to a database that stores command files. Once the attacker has completed this step, the attacker will have successfully reached the "Pivot to Server with Database access" 916 internal node (i.e., via "network toehold" 910 and "gain proximal toehold on network" 914). Once the attacker has access to the database, (s)he will need to locate a spacecraft command file and manipulate the access control permissions to allow the attacker to modify (or replace via 918) the file. Once twps. 916 and 918 are complete, the spacecraft command file has become compromised at 920. After compromising the spacecraft command file at 920, the attacker will need to wait until the spacecraft command file is radiated to the spacecraft. After the compromised commands have been sent to the spacecraft 922, the attacker will have successfully compromised the spacecraft 924.

As discussed above, the next step in constructing the threat model is to annotate the attack tree with attributes from the system model. For example, the phrase "Install malware at local internet cafe" 902 is shorthand for installing malware on an internal computer which can be taken offsite. In this case, this node 902 may be annotated with the properties of (type=Laptop, name=Internal Laptop). The annotations of the leaf nodes (i.e., nodes 902-908, 912, 916-918) of the attack tree discussed above are indicated in bold in FIG. 9. The generality or specificity of the annotations is at the user's discretion. For example, the designer of the attack tree could have meant that the malware to be installed would only target OSX operating systems with Firefox 43.0.1. In which case the annotation would be (type=Laptop, name=Internal Laptop, OS=OSX, app=Firefox 43.0.1).

Once annotated, a mission impact assessment is conducted. In particular, once the attack tree has been annotated, it must be reconciled with the system model. The basic idea behind the methodology for conducting the mission impact assessment is to match up the annotations of the attack tree with attributes of the system model. In more detail, a user will first select an entry node of the attack tree. The entry nodes are distinguished amongst the leaf nodes in the attack tree since they are the first actions that an adversary must take in order to gain access to the larger goal. The choice of an entry node will then determine a unique path in the attack tree with which the adversary can reach the root node.

Figure 10:
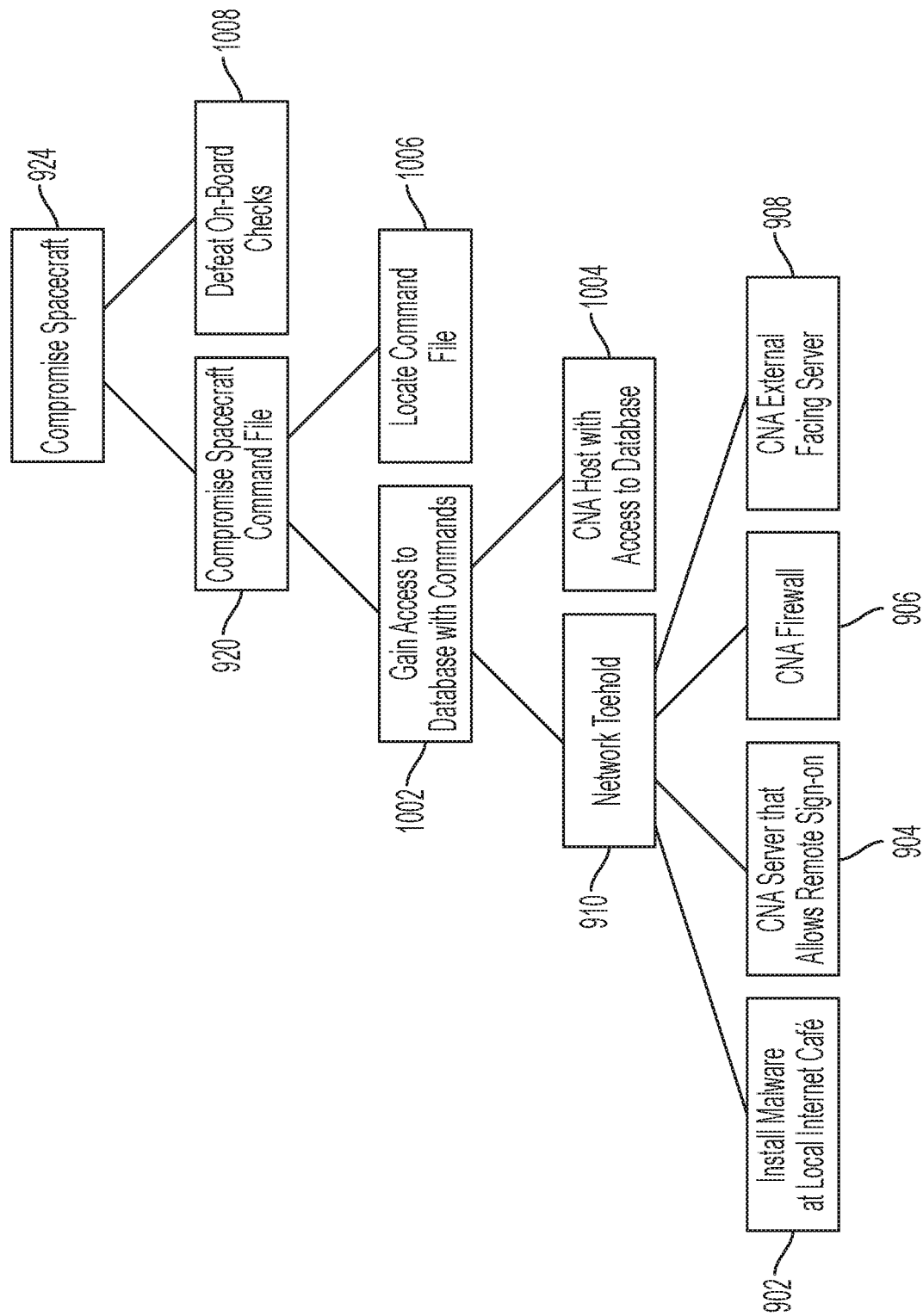
FIG. 10 illustrates an attack path for command and control of spacecraft with a single entry node selected in accordance with one or more embodiments of the invention.

FIG. 10 illustrates an attack path for command and control of spacecraft with a single entry node selected in accordance with one or more embodiments of the invention. More specifically, FIG. 10 illustrates the path to the root node 924 if the adversary executes the node "Install malware at local internet café" 902. For ease of the discussion, one may assume that there is at most one internal vertex with a combinator of AND on each level. The above discussion still holds, but the choice of an entry point does not lead to a unique path in the attack tree. Instead the choice of an entry point will lead to n paths where n is the number of entry points on the subtree with root node equal to the other sibling vertices with a combinator of AND.

Methodology to Find the Unique Path

Referring to FIG. 10, once the entry node (e.g., node 902) is selected, all unique paths from the root 924 to that node 902 will be computed. The paths are returned as a list of dictionaries. Each parent-child or parent-children tuple is captured in the following format:

{parent: [child(ren)] }.

For example, looking at the attack tree in FIG. 10, then, if "Install malware at Local Internet café" 902 was selected as the entry point, the following attack path would be generated:

```
[
    { Network toehold              : [ Install malware at local internet cafe ] },
    { Gain Proximal Toehold on Network  : [ Network toehold, CNA Proximal Server ] },
    { Compromise spacecraft command file: [ Gain Proximal Toehold on Network,
                                            Pivot to Server with Database Access,
                                            Replace Command File ] },
    { Compromise Spacecraft         : ( Compromise spacecraft command file,
                                         Send Command File to Spacecraft ] }
]
```

In other words, the path proceeds from node 902 to node 910 to node 1002 to node 920, to node 924. Further, at each level the nodes 1004, 1006 and 1008 are also traversed (i.e., before moving to the parent level). The function that generates these paths recursively traverses from the root node 924 to the entry node 902. The function first checks if the node's parent has condition AND or OR. Recall that the root 924 will not have a parent, and will always have children, so it is automatically added to the path. If the node's parent is OR, the node will be added to the path without its individual siblings. If the node's parent is AND, each of the node's conditional siblings, along with the paths to those conditional siblings, must be added to the path (e.g., node 910 has sibling node 1004, node 1002 has sibling node 1006, and node 920 has sibling node 1008). The methodology terminates when it has added all paths from all entry nodes to the root node 924. Finally, the list of paths is pruned for those starting with the entry node 902 that the user selected. Pseudocode to get all the paths from all entry nodes to the root node is shown below.

```
Get all paths from all entry nodes to the root node of Attack Tree

1:  function GETPATHRECUR(currentNode,parent)
2:    if parent.condition == AND then
3:      add {parent : [node, child2, ..., childn] } to path in allPathsList
4:      add children to list of neighbors to explore
5:    else if parent.condition == OR then
6:      for child in parent.children do
7:        duplicate path and add {parent : [child]} to duplicated path
8:        GetPathRecur(child, leftmost child of child)
9:      end for
10:   end if
11:   if node is leaf node then
12:     if node is conditional sibling then
13:       add the paths from the other conditional siblings
14:     else if node is an independent sibling then
15:       the path has ended
16:     end if
17:   end if
18:   return list of neighbors
19: end function
20: function GETPATHS(entryNode)
21:   allPathsList = list( )
22:   neighbors = GetPathRecur(currentNode=root, parent=NULL)
23:                           ▷ Add subtrees from conditional siblings if
                                  conditional siblings were found
24:   for neighbor in neighbors do
25:     GetPathRecur(currentNode=neighbor, parent=neighbor.parent)
26:   end for                ▷ Prune allPathsList for those
                                  starting with entryNode
27:   entryNodePaths = list( )
28:   for path in allPathsList do
29:     if Path begins with entryNode then
30:       add path to entryNodePaths
31:     end if
32:   end for
33:   return entryNodePaths
34: end function
```

After the user has selected an entry node, the first step in the methodology is to find all nodes within the system model whose attributes match the annotation of the selected entry node. If there do not exist any nodes in the system model with those attributes, then the attack through that entry point will fail and the user will be prompted with a message that the attack has failed. However, if the number of selected system model nodes is greater than zero, then the user is prompted to make a selection in the visualization. The methodology will then proceed to the sibling directly to the right and begin the selection process based on the attributes of that node. If a node in the system model is selected by the user and is not equal to the current node in the system model, then the shortest path between the two nodes is taken. This can provide valuable insight to the user by showing which network devices the adversary must traverse in order to pivot from an internal laptop to a server. If all the siblings have been successfully traversed, then the methodology will proceed to the parent node and repeat the search on the parent node's siblings. The methodology will terminate when the root node is reached or there exists a leaf node with an empty selection in the system model.

It should be noted, if the leaf node has a Server or a Laptop as the annotated type then the methodology by default will search for those nodes in the model with CVEs whose Access Vector is equal to Network and Allows Access is not equal to None. In other words, embodiments of the invention search for hardware with vulnerabilities that allow an adversary to gain privilege via a network-based attack. However, if the attribute Zero-Day is set to be True, then all Laptops or Servers will be selected from the system model, and further selection from those can occur based on the other attributes such as Application or OS to which the Zero-Day applies. A similar search can occur if a specific CVE id number is entered as the attribute, e.g., CVE-2015-7112.

Hardware Environment

Figure 11:
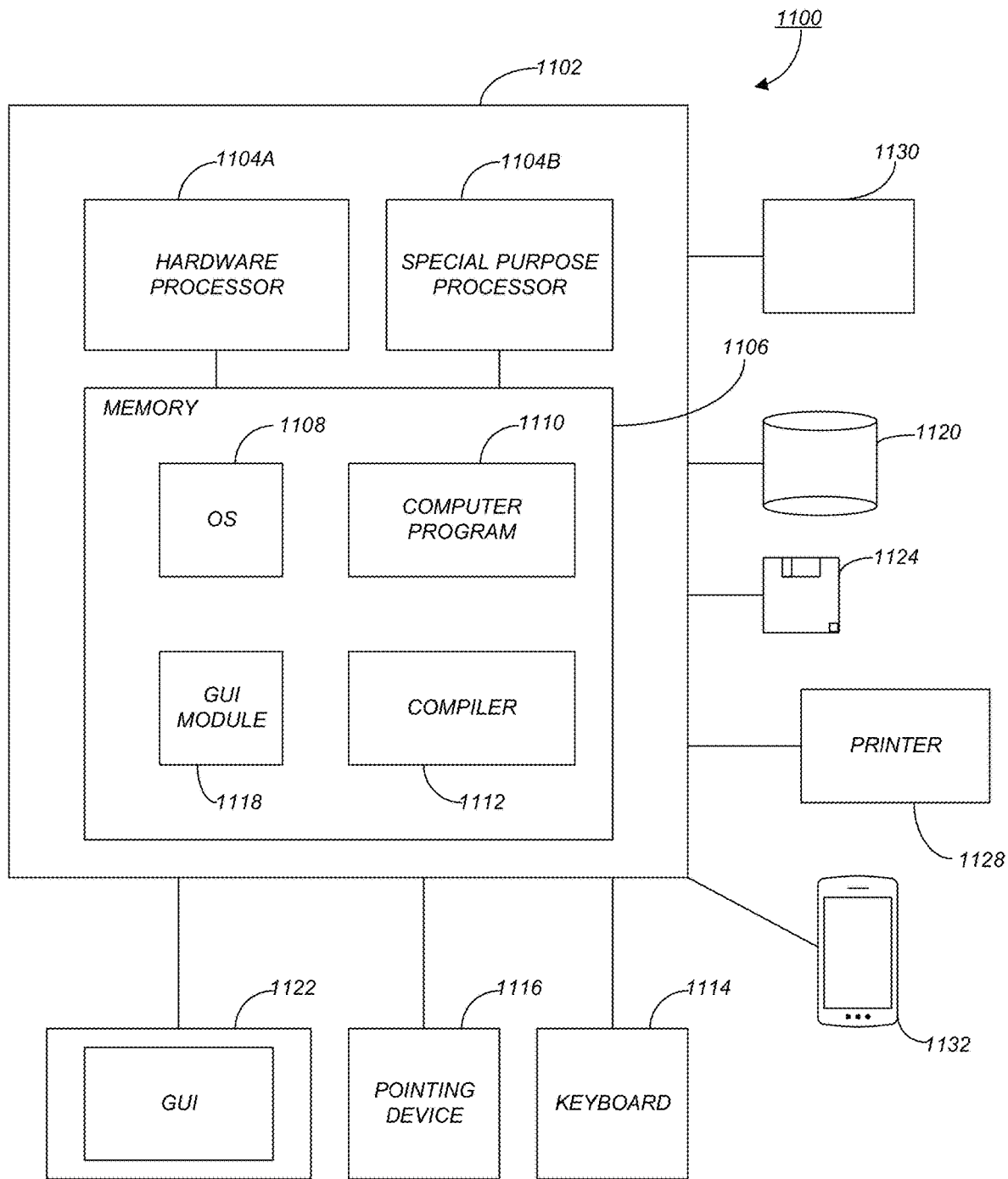
FIG. 11 is an exemplary hardware and software environment used to implement one or more embodiments of the invention.

FIG. 11 is an exemplary hardware and software environment 1100 used to implement one or more embodiments of the invention. As described above, the various hardware components in layer 302 of FIG. 3 may be implemented in/using the hardware and software environment 1100 of FIG. 11. The hardware and software environment includes a computer 1102 and may include peripherals. Computer 1102 may be a user/client computer, server computer, or may be a database computer. The computer 1102 comprises a hardware processor 1104A and/or a special purpose hardware processor 1104B (hereinafter alternatively collectively referred to as processor 1104) and a memory 1106, such as random access memory (RAM). The computer 1102 may be coupled to, and/or integrated with, other devices, including input/output (I/O) devices such as a keyboard 1114, a cursor control device 1116 (e.g., a mouse, a pointing device, pen and tablet, touch screen, multi-touch device, etc.) and a printer 1128. In one or more embodiments, computer 1102 may be coupled to, or may comprise, a portable or media viewing/listening device 1132 (e.g., an MP3 player, IPOD, NOOK, portable digital video player, cellular device, personal digital assistant, etc.). In yet another embodiment, the computer 1102 may comprise a multi-touch device, mobile phone, gaming system, internet enabled television, television set top box, or other internet enabled device executing on various platforms and operating systems.

In one embodiment, the computer 1102 operates by the hardware processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108, to provide output and results.

Output/results may be presented on the display 1122 or provided to another device for presentation or further processing or action. In one embodiment, the display 1122 comprises a liquid crystal display (LCD) having a plurality of separately addressable liquid crystals. Alternatively, the display 1122 may comprise a light emitting diode (LED) display having clusters of red, green and blue diodes driven together to form full-color pixels. Each liquid crystal or pixel of the display 1122 changes to an opaque or translucent state to form a part of the image on the display in response to the data or information generated by the processor 1104 from the application of the instructions of the computer program 1110 and/or operating system 1108 to the input and commands. The image may be provided through a graphical user interface (GUI) module 1118. Although the GUI module 1118 is depicted as a separate module, the instructions performing the GUI functions can be resident or distributed in the operating system 1108, the computer program 1110, or implemented with special purpose memory and processors.

In one or more embodiments, the display 1122 is integrated with/into the computer 1102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program 1110 instructions. In one embodiment, the special purpose processor 1104B is an application specific integrated circuit (ASIC).

The computer 1102 may also implement a compiler 1112 that allows an application or computer program 1110 written in a programming language such as C, C++, Assembly, SQL, PYTHON, PROLOG, MATLAB, RUBY, RAILS, HASKELL, or other language to be translated into processor 1104 readable code. Alternatively, the compiler 1112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1110 accesses and manipulates data accepted from I/O devices and stored in the memory 1106 of the computer 1102 using the relationships and logic that were generated using the compiler 1112.

The computer 1102 also optionally comprises an external communication device such as a modem, satellite link, Ethernet card, or other device for accepting input from, and providing output to, other computers 1102.

In one embodiment, instructions implementing the operating system 1108, the computer program 1110, and the compiler 1112 are tangibly embodied in a non-transitory computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of computer program 1110 instructions which, when accessed, read and executed by the computer 1102, cause the computer 1102 to perform the steps necessary to implement and/or use the present invention or to load the program of instructions into a memory 1106, thus creating a special purpose data structure causing the computer 1102 to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1102.

Figure 12:
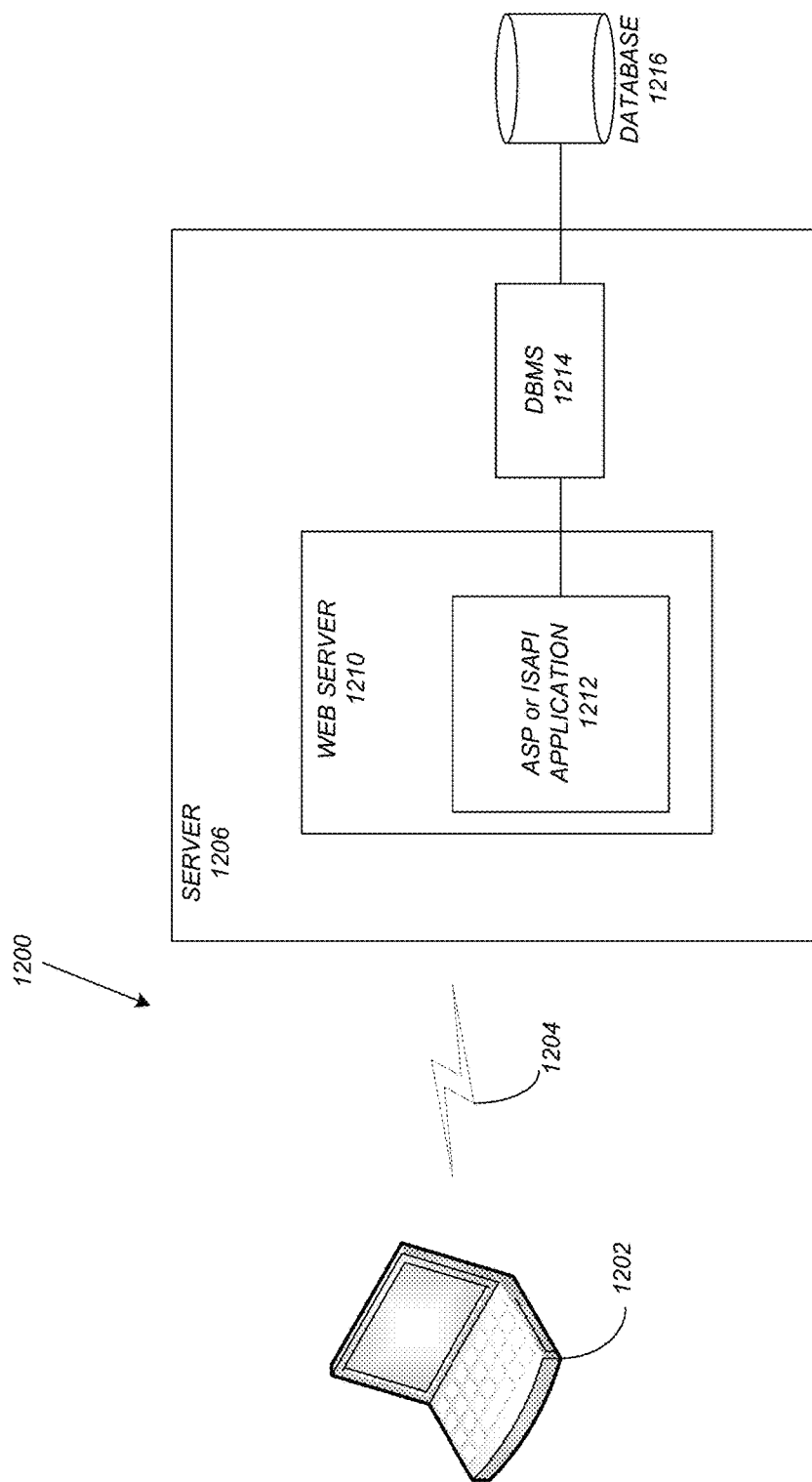
FIG. 12 schematically illustrates a typical distributed/cloud-based computer system using a network to connect client computers to server computers in accordance with one or more embodiments of the invention.

FIG. 12 schematically illustrates a typical distributed/cloud-based computer system 1200 using a network 1204 to connect client computers 1202 to server computers 1206. A typical combination of resources may include a network 1204 comprising the Internet, LANs (local area networks), WANs (wide area networks), SNA (systems network architecture) networks, or the like, clients 1202 that are personal computers or workstations (as set forth in FIG. 11), and servers 1206 that are personal computers, workstations, minicomputers, or mainframes (as set forth in FIG. 11). However, it may be noted that different networks such as a cellular network (e.g., GSM [global system for mobile communications] or otherwise), a satellite based network, or any other type of network may be used to connect clients 1202 and servers 1206 in accordance with embodiments of the invention.

A network 1204 such as the Internet connects clients 1202 to server computers 1206. Network 1204 may utilize ethernet, coaxial cable, wireless communications, radio frequency (RF), etc. to connect and provide the communication between clients 1202 and servers 1206. Further, in a cloud-based computing system, resources (e.g., storage, processors, applications, memory, infrastructure, etc.) in clients 1202 and server computers 1206 may be shared by clients 1202, server computers 1206, and users across one or more networks. Resources may be shared by multiple users and can be dynamically reallocated per demand. In this regard, cloud computing may be referred to as a model for enabling access to a shared pool of configurable computing resources.

Clients 1202 may execute a client application or web browser and communicate with server computers 1206 executing web servers 1210. Such a web browser is typically a program such as MICROSOFT INTERNET EXPLORER, MOZILLA FIREFOX, OPERA, APPLE SAFARI, GOOGLE CHROME, etc.

Further, the software executing on clients 1202 may be downloaded from server computer 1206 to client computers 1202 and installed as a plug-in or ACTIVEX control of a web browser. Accordingly, clients 1202 may utilize ACTIVEX components/component object model (COM) or distributed COM (DCOM) components to provide a user interface on a display of client 1202. The web server 1210 is typically a program such as MICROSOFT'S INTERNET INFORMATION SERVER.

Web server 1210 may host an Active Server Page (ASP) or Internet Server Application Programming Interface (ISAPI) application 1212, which may be executing scripts. The scripts invoke objects that execute business logic (referred to as business objects). The business objects then manipulate data in database 1216 through a database management system (DBMS) 1214. Alternatively, database 1216 may be part of, or connected directly to, client 1202 instead of communicating/obtaining the information from database 1216 across network 1204. When a developer encapsulates the business functionality into objects, the system may be referred to as a component object model (COM) system. Accordingly, the scripts executing on web server 1210 (and/or application 1212) invoke COM objects that implement the business logic. Further, server 1206 may utilize MICROSOFT'S TRANSACTION SERVER (MTS) to access required data stored in database 1216 via an interface such as ADO (Active Data Objects), OLE DB (Object Linking and Embedding DataBase), or ODBC (Open DataBase Connectivity).

Generally, these components 1200-1216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1202 and 1206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1202 and 1206. Accordingly, embodiments of the invention are implemented as a software application on a client 1202 or server computer 1206. Further, as described above, the client 1202 or server computer 1206 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, cloud based computing system, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for acting on cyber risks, comprising:
   gathering system characteristics and system information for a cyber system;
   pre-processing the system characteristics and system information to identify vulnerabilities that are relevant to the cyber system;
   generating a system model of a cyber environment for the cyber system, wherein:
      the system model comprises multiple layers, wherein each of the multiple layers comprises components, wherein connections exist between different components on different layers of the multiple layers, and wherein the connections between layers are compositional;
      the multiple layers comprise a hardware layer, a software layer, a file layer, and a work process layer;
      the components of the work process layer comprise work processes, wherein each work process comprises a mission task or objective that contributes to a mission goal;
      the components of the file layer comprise data that supports the work processes;
      the components of the software layer comprise applications that supports the file layer or work processes;
      the components of the hardware layer comprise hardware infrastructure for the cyber system, and supports the software layer;
      the generating the system model comprises modeling entities of the cyber system using a graph based approach, wherein:
      each unique element in the hardware layer, software layer, file layer, and workflow process layer, corresponds to a vertex of a graph;
      associated to each vertex are one or more attributes that make up properties of the model; and
      edges of the graph are specified by connections between the unique elements and each edge represents a relationship between vertices connected by the edge;
   converting one or more features from cyber threat reports to one or more semantically relevant queries over the system model, wherein the converting is based on the multiple layers;
   reasoning over the multiple layers of the system model to generate one or more answers relevant to the one or more semantically relevant queries, wherein the one or more answers form a part of actionable intelligence, and wherein the reasoning is over at least one of the file layer and the work process layer; and
   executing attack models over the system model to generate comprehensive actionable intelligence, wherein the comprehensive actionable intelligence is based on the part of the actionable intelligence.

2. The computer-implemented method of claim 1, wherein the system characteristics and system information comprises:
   network configuration information;
   common attributes of one or more end hosts; and
   attributes of the one or more end hosts that are not exposed to a network and cannot be deduced remotely.

3. The computer-implemented method of claim 1, wherein the gathering comprises:
   passing the system characteristics and system information through a data parser to parse system characteristics and system information into a readable format;

a firewall and network parser reading firewall and network confirmation to change a format of the firewall and network configuration information into the readable format;

a software package parser reading package information regarding packages installed on an end host, and outputting a file containing a subset of the package information for the installed packages;

providing the file to a vulnerability database tool that associates common vulnerabilities and exposures (CVE) information with each of the packages installed on the end host;

the vulnerability database tool storing a local instance of a National Vulnerability Database (NVD) database;

storing, in a cyber database, the system characteristics and information, firewall and network configuration information, and the CVE information for each of the packages installed on the end host, wherein the cyber database is accessed by the pre-processing.

4. The computer-implemented method of claim 1, wherein the pre-processing comprises performing, for each host on a network:

gathering package and version information from the host;

searching, based on the package and version information, a national vulnerability database, and generating a list of common vulnerabilities and exposures (CVEs) that are relevant to the host;

cross referencing the list of CVEs with information from one or more vendor specific databases to eliminate CVEs that are already patched; and outputting a true positive list as valid CVEs for the host.

5. The computer-implemented method of claim 1, wherein the converting one or more features from cyber threat reports to the one or more semantically relevant queries over the system model comprises:

interfacing with data in the system model based on an underlying reasoning infrastructure to provide domain-specific semantically relevant language for the one or more semantically relevant queries.

6. The computer-implemented method of claim 1, wherein the reasoning comprises:

utilizing the system characteristics and system information as one or more facts;

accepting one or more rules to operate on the one or more facts; and conducting the reasoning using logical deduction over the one or more rules and one or more facts.

7. The computer-implemented method of claim 6, wherein the reasoning further comprises, for each of the one or more generated answers:

assigning each of the one or more facts a confidence score that is dependent on one or more factors, wherein for each fact, the assigning comprises:

passing each of the one or more factors through an age function, wherein the age function computes an age value confidence, for each factor, with respect to age; and aggregating the age value confidences for all factors to determine the confidence score for the fact; and combining the confidence scores for all of the facts to determine an analysis score for the generated answer.

8. The computer-implemented method of claim 6, wherein the reasoning further comprises:

ranking the one or more answers by the confidence scores; and utilizing the ranking to select one or more of the one or more answers.

9. The computer-implemented method of claim 1, wherein the executing comprises:

generating an attack tree comprising multiple nodes comprising a root node and ancestor nodes, wherein:

the root node of the multiple nodes is an objective of an attacker;

one or more ancestor nodes of the root node represent sub-goals that must be completed to achieve an objective;

forwarding the attack tree to a threat model simulation engine that translates the attack tree into the one or more semantically relevant queries that are processed to generate the one or more answers, wherein:

the one or more semantically relevant queries are formed via one or more model attributes on each leaf node, of the multiple nodes, and how an attacker would pivot from one leaf node to another leaf node; and presenting a user with the one or more semantically relevant queries, wherein each of the one or more semantically relevant queries represents a different attack campaign that was run on the system model.

10. The computer-implemented method of claim 9, wherein:

the generating the attack tree comprises:

constructing the attack tree;

annotating the attack tree for execution over the system model, wherein the annotating comprises annotating the one or more leaf nodes with attributes contained in the system model, wherein the annotating enables the one or more leaf nodes to be mapped to assets of the cyber system; and reconciling the annotated attack tree with the system model by matching up annotations of the attack tree with the attributes of the system model, wherein the reconciling traverses the attack tree via an entry node, of the multiple nodes, and determines unique paths from the root node to the entry node.

11. The computer-implemented method of claim 1, wherein:

the one or more semantically relevant queries are specific to the cyber system.

12. An apparatus for reducing risk from cyber attacks comprising:

(a) a computer having a memory;

(b) a cyber analytics and visualization environment (CAVE) application executing on the computer, wherein the CAVE application:

(1) gathers system characteristics and system information for a cyber system;

(2) pre-processes the system characteristics and system information to identify vulnerabilities that are relevant to the cyber system;

(3) generates a system model of a cyber environment for the cyber system, wherein:

the system model comprises multiple layers, wherein each of the multiple layers comprises components, wherein connections exist between different components on different layers of the multiple layers, and wherein the connections between layers are compositional;

the multiple layers comprise a hardware layer, a software layer, a file layer, and a work process layer;

the components of the work process layer comprise work processes that comprise a mission task or objective that contributes to a mission goal;

the components of the file layer comprise data that supports the work processes;

the components of the software layer comprise applications that supports the file layer or work processes;

the components of the hardware layer comprise hardware infrastructure for the cyber system, and supports the software layer; and the generation of the system model comprises modeling entities of the cyber system using a graph based approach, wherein:

each unique element in the hardware layer, software layer, file layer, and workflow process layer, corresponds to a vertex of a graph;

associated to each vertex are one or more attributes that make up properties of the model; and edges of the graph are specified by connections between the unique elements and each edge represents a relationship between vertices connected by the edge;

(4) converts one or more features from cyber threat reports to one or more semantically relevant queries over the system model, wherein the converting is based on the multiple layers;

(5) reasons over the multiple layers of the system model to generate one or more answers relevant to the one or more semantically relevant queries, wherein the one or more answers form a part of actionable intelligence, and wherein the reasoning is over at least one of the file layer and the work process layer; and (6) executes attack models over the system model to generate comprehensive actionable intelligence, wherein the comprehensive actionable intelligence is based on the part of the actionable intelligence.

13. The apparatus of claim 12, wherein the system characteristics and system information comprises:

network configuration information;

common attributes of one or more end hosts; and attributes of the one or more end hosts that are not exposed to a network and cannot be deduced remotely.

14. The apparatus of claim 12, wherein the CAVE application gathers by:

passing the system characteristics and system information through a data parser to parse the system characteristics and system information into a readable format;

a firewall and network parser reading firewall and network confirmation to change a format of the firewall and network configuration information into the readable format;

a software package parser reading package information regarding packages installed on an end host, and outputting a file containing a subset of the package information for the installed packages;

providing the file to a vulnerability database tool that associates common vulnerabilities and exposures (CVE) information with each of the packages installed on the end host;

the vulnerability database tool storing a local instance of a National Vulnerability Database (NVD) database;

storing, in a cyber database, the system characteristics and information, firewall and network configuration information, and the CVE information for each of the packages installed on the end host, wherein the cyber database is accessed by the pre-processing.

15. The apparatus of claim 12, wherein the CAVE application performs the pre-processing by performing, for each host on a network:

gathering package and version information from the host;

searching, based on the package and version information, a national vulnerability database, and generating a list of common vulnerabilities and exposures (CVEs) that are relevant to the host;

cross referencing the list of CVEs with information from one or more vendor specific databases to eliminate CVEs that are already patched; and outputting a true positive list as valid CVEs for the host.

16. The apparatus of claim 12, wherein the CAVE application converts one or more features from cyber threat reports to the one or more semantically relevant queries over the system model by:

interfacing with data in the system model based on an underlying reasoning infrastructure to provide domain-specific semantically relevant language for the one or more semantically relevant queries.

17. The apparatus of claim 12, wherein the CAVE application reasons by:

utilizing the system characteristics and system information as one or more facts;

accepting one or more rules to operate on the one or more facts; and conducting the reasoning using logical deduction over the one or more rules and one or more facts.

18. The apparatus of claim 17, wherein the CAVE application reasons by performing, for each of the one or more generated answers:

assigning each of the one or more facts a confidence score that is dependent on one or more factors, wherein for each fact, the assigning comprises:

passing each of the one or more factors through an age function, wherein the age function computes an age value confidence, for each factor, with respect to age; and aggregating the age value confidences for all factors to determine the confidence score for the fact; and combining the confidence scores for all of the facts to determine an analysis score for the generated answer.

19. The apparatus of claim 17, wherein the CAVE application further reasons by:

ranking the one or more answers by the confidence scores; and utilizing the ranking to select one or more of the one or more answers.

20. The apparatus of claim 12, wherein the CAVE application executes by:

generating an attack tree comprising multiple nodes comprising a root node and ancestor nodes, wherein:

the root node of the multiple nodes is an objective of an attacker;

one or more ancestor nodes of the root node represent sub-goals that must be completed to achieve an objective;

forwarding the attack tree to a threat model simulation engine that translates the attack tree into the one or more semantically relevant queries that are processed to generate the one or more answers, wherein:

the one or more semantically relevant queries are formed via one or more model attributes on each leaf node, of the multiple nodes, and how an attacker would pivot from one leaf node to another leaf node; and presenting a user with the one or more semantically relevant queries, wherein each of the one or more semantically relevant queries represents a different attach campaign that was run on the system model.

21. The apparatus of claim 20, wherein:
the CAVE application generates the attack tree by:
constructing the attack tree;
annotating the attack tree for execution over the system model, wherein the annotating comprises annotating the one or more leaf nodes with attributes contained in the system model, wherein the annotating enables the one or more leaf nodes to be mapped to assets of the cyber system; and
reconciling the annotated attack tree with the system model by matching up annotations of the attack tree with the attributes of the system model, wherein the reconciling traverses the attack tree via an entry node, of the multiple nodes, and determines unique paths from the root node to the entry node.

22. The apparatus of claim 12, wherein:
the one or more semantically relevant queries are specific to the cyber system.

* * * * *